(12) United States Patent
Wesel et al.

(10) Patent No.: US 10,374,759 B2
(45) Date of Patent: *Aug. 6, 2019

(54) HIGH THROUGHPUT COMMUNICATION SYSTEM

(71) Applicant: THE REGENTS OF THE UNIVERSITY OF CALIFORNIA, Oakland, CA (US)

(72) Inventors: Richard Wesel, Los Angeles, CA (US); Kasra Vakilinia, Los Angeles, CA (US); Sudarsan V S Ranganathan, Los Angeles, CA (US); Dariush Divsalar, Pacific Palisades, CA (US); Haobo Wang, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/978,165

(22) Filed: May 13, 2018

(65) Prior Publication Data

US 2018/0323914 A1 Nov. 8, 2018

Related U.S. Application Data

(63) Continuation of application No. 15/430,093, filed on Feb. 10, 2017, now Pat. No. 9,998,260.

(Continued)

(51) Int. Cl.
*H04L 1/00* (2006.01)
*H04L 1/22* (2006.01)
*H04L 1/16* (2006.01)

(52) U.S. Cl.
CPC .............. *H04L 1/22* (2013.01); *H04L 1/0057* (2013.01); *H04L 1/0059* (2013.01);
(Continued)

(58) Field of Classification Search
CPC ....... H04L 1/22; H04L 1/0057; H04L 1/0059; H04L 1/0061; H04L 1/0068; H04L 1/165
See application file for complete search history.

(56) References Cited

U.S. PATENT DOCUMENTS 8,112,695 B2 * 2/2012 Costa ................. H03M 13/1148
714/781
8,196,005 B2 * 6/2012 Kienle ............... H03M 13/1165
714/752

(Continued)

OTHER PUBLICATIONS

Chung, Sae-Young et al., "On the Design of Low-Density Parity-Check Codes within 0.0045 dB of the Shannon Limit", IEEE Communications Letters, vol. 5. No. 2, Feb. 2001, pp. 58-60.

(Continued)

*Primary Examiner* — Janice N Tieu
(74) *Attorney, Agent, or Firm* — O'Banion & Ritchey LLP; John P. O'Banion

(57) ABSTRACT

A high throughput communication apparatus which provides low frame error rates (FER). Error checking encoder and decoders which each comprise a plurality of short blocklength error checking encoders or decoders, respectively, in parallel, coupled through common incremental redundancy. Short-blocklength codes are utilized to achieve communication capacity with incremental redundancy. The system can transmit and decode a large number of short-blocklength codewords in parallel, while it delivers incremental redundancy, without feedback, only to the decoders that need incremental redundancy.

20 Claims, 7 Drawing Sheets

Related U.S. Application Data

(60) Provisional application No. 62/294,093, filed on Feb. 11, 2016.

(52) U.S. Cl.
CPC .......... *H04L 1/0061* (2013.01); *H04L 1/0068* (2013.01); *H04L 1/165* (2013.01)

(56) References Cited

U.S. PATENT DOCUMENTS

| | | | |
|---|---|---|---|
| 8,489,957 B2 | 7/2013 | Wesel | |
| 8,775,915 B2* | 7/2014 | Adas | H03M 13/1111 |
| | | | 714/800 |
| 2005/0111345 A1 | 5/2005 | Jacobsen | |
| 2014/0254351 A1 | 9/2014 | Newman | |

OTHER PUBLICATIONS

International Telecommunication Union, "Forward error correction for high bit-rate DWDM submarine systems", ITU-T Recommendation G.975.1, Feb. 2005, pp. 1-58.

Zeineddine, Hady et al., "Inter-Frame Coding for Broadcast Communication", IEEE Journal on Selected Areas in Communications, vol. 34, No. 2, Feb. 2016, pp. 437-452.

Polyanskiy, Yury et al., "Channel Coding Rate in the Finite Blocklength Regime", IEEE Transactions on Information Theory, vol. 56, No. 5, May 2010, pp. 2307-2359.

Polyanskiy, Yury et al., "Feedback in the Non-Asymptotic Regime", IEEE Transactions on Information Theory, vol. 57, No. 8, Aug. 2011, pp. 4903-4925.

Williamson, Adam R. et al., "Variable-Length Convolutional Coding for Short Blocklengths With Decision Feedback", IEEE Transactions on Communications, vol. 63, No. 7, Jul. 2015, pp. 2389-2403.

Vakilinia, Kasra et al., "Feedback Systems using Non-Binary LDPC Codes with a Limited Number of Transmissions", IEEE Information Theory Workshop, Hobart, Tasmania, Australia, Nov. 2014, pp. 167-171.

Williamson, Adam R. et al., "Firing the Genie: Two-Phase Short-blocklength Convolutional Coding with Feedback", IEEE 2013 Information Theory and Applications Workshop (ITA), San Diego, California, Feb. 10-15, 2013, pp. 1-6.

Elias, Peter, "Error-Free Coding", Transactions of the IRE Professional Group on Information Theory, 4(4):29-37, 1954.

Lou, Chung-Yu et al., "Convolutional-Code-Specific CRC Code Design", IEEE Transactions on Communications, vol. 63, No. 10, Oct. 2015, pp. 3459-3470.

Shamai (Shitz), Shlomo et al., "Systematic Lossy Source/Channel Coding", IEEE Transactions on Information Theory, vol. 44, No. 2, Mar. 1998, pp. 564-579.

Wyner, Aaron D. et al., "The Rate-Distortion Function for Source Coding with Side Information at the Decoder", IEEE Transactions on Information Theory, vol. IT-22, No. 1, Jan. 1976, pp. 1-10.

Verdu, Serio et al., "The Information Lost in Erasures", IEEE Transactions on Information Theory, vol. 54, No. 11, Nov. 2008, pp. 5030-5058.

Perron, Etienne et al., "Lossy Source Coding with Gaussian or Erased Side-Information", ISIT 2009, Seoul Korea, Jun. 28-Jul. 23, 2009, In Proc. IEEE Int. Symp. Inform. Theory, pp. 1035-1039, Jun. 2009.

Luby, Michael G. et al., "Efficient Erasure Correcting Codes", IEEE Transactions on Information Theory, vol. 47, No. 2, Feb. 2001, pp. 569-584.

Shokrollahi, Amin, "Raptor Codes", IEEE Transactions on Information Theory, vol. 52, No. 6, Jun. 2006, pp. 2551-2567.

Chen, Tsung-Yi et al., "Protograph-Based Raptor-Like LDPC Codes", IEEE Transactions on Communications, vol. 63, No. 5, May 2015, pp. 1522-1532.

Chung, Sae-Young, "On the Construction of Some Capacity-Approaching Coding Schemes", Massachusetts Institute of Technology, Sep. 2000, pp. 1-242.

Divsalar, Dsariush et al., "Capacity-Approaching Protograph Codes", IEEE Journal on Selected Areas in Communications, vol. 27, No. 6, Aug. 2009, pp. 876-888.

Richardson, Thomas J., "The Capacity of Low-Density Parity-Check Codes Under Message-Passing Decoding", IEEE Transactions on Information Theory, vol. 47, No. 2, Feb. 2001, pp. 599-618.

Richardson, Thomas J., "Design of Capacity-Approaching Irregular Low-Density Parity-Check Codes", IEEE Transactions on Information Theory, vol. 47, No. 2, Feb. 2001, pp. 619-637.

Mitchell, David G. M. et al., "Randomly Punctured Spatially Coupled LDPC Codes", IEEE 2014 8th Annual International Symposium on Turbo Codes and Iterative Information Processing (ISTC), 2004, pp. 1-6.

Mitchell, David G. M. et al., "Approximating Decoding Thresholds of Punctured LDPC Code Ensembles on the AWGN Channel", IEEE ISIT 2015, Jun. 2015, pp. 421-425.

Cheng, Jung-Fu et al., "Some High-Rate Near Capacity Codecs for the Gaussian Channel", 34th Allerton Conference on Communications, Control and Computing, Oct. 4, 1996, pp. 1-10.

Shokrollahi, Amin et al., "7.7 Design of Efficient Erasure Codes with Differential Evolution", Natural Computing Series, Differential Evolution, Springer-Verlag Berlin Heidelberg 2005, pp. 413-427.

Smith, Robert L., "Efficient Monte Carlo Procedures for Generating Points Uniformly Distributed Over Bounded Regions", Operations Research, vol. 32, No. 6, Nov.-Dec. 1984, pp. 1296-1308.

Hu, Xiao-Yu et al., "Regular and Irregular Progressive Edge-Growth Tanner Graphs", IEEE Transactions on Information Theory, vol. 51, No. 1, Jan. 2005, pp. 386-398.

\* cited by examiner

HIGH THROUGHPUT COMMUNICATION SYSTEM

CROSS-REFERENCE TO RELATED APPLICATIONS

This application is a continuation of U.S. patent application Ser. No. 15/430,093 filed on Feb. 10, 2017, incorporated herein by reference in its entirety, which claims priority to, and the benefit of, U.S. provisional patent application Ser. No. 62/294,093 filed on Feb. 11, 2016, incorporated herein by reference in its entirety.

STATEMENT REGARDING FEDERALLY SPONSORED RESEARCH OR DEVELOPMENT

This invention was made with Government support under 1162501, awarded by the National Science Foundation. The Government has certain rights in the invention.

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to high-throughput communications using error control codes, and more particularly to using variable-length codes with incremental redundancy to approach the Shannon capacity without using feedback to control the transmission of incremental redundancy.

2. Background Discussion

It is well-known that carefully designed error-control codes with very long blocklengths can closely approach theoretical capacity. For example, as demonstrated in 2001 by Chung et al. ("On the design of low-density parity-check codes within 0.0045 dB of the Shannon limit. IEEE Comm. Let., 5(2):58-60, February 2001"), a low-density parity-check (LDPC) code with a blocklength of $10^7$ bits can achieve a bit error rate of $10^{-6}$ at a signal-to-noise ratio (SNR) within 0.04 dB of the Shannon limit. However, approaching capacity while simultaneously achieving high throughputs on the order of 100 gigabits per second (Gbps), or more, remains an active area of research.

One example application where high throughput is critical is that of optical transport networks (OTNs). The OTU G.975.1 standard describes forward error correction (FEC) for high-bit-rate dense wavelength division multiple-access (DWDMA) submarine systems. This standard describes "super FEC" schemes that have a higher error-correction capability than the (255,239) Reed-Solomon code, which is the baseline for OTNs. Recent approaches for OTNs include Staircase codes and Braided BCH Codes, which provide significant improvements over the "super FECs" at high throughputs on the order of 100 Gbps. Systems that approach the hard-decoding capacity have been proposed. Spatially-coupled (SC) LDPC codes with windowed decoding provide a possible solution to high-throughput communication systems with soft decoding.

The growing demand for data drives a demand for improved performance over difficult channels. This pushes implementations toward soft decoding and even higher throughputs. Systems constrained to hard decoding cannot approach the soft-decoding capacity. At high throughputs beyond 100 Gbps, the complexity of place-and-route for capacity-approaching schemes, such as iterative belief-propagation decoding of a long-blocklength LDPC code, present a significant challenge. Another factor affecting complexity for soft decoding is that iterative belief-propagation decoders require a larger number of iterations as their operating point approaches the Shannon limit. A third concern is the ability to provide a guarantee on frame error rate (FER) that meets the requirements of high-throughput networks, which sometimes require FERs below $10^{-15}$. Guaranteeing low FERs for long-blocklength LDPC codes is difficult as the error-floor behavior of LDPC codes is hard to characterize analytically. Even with windowed SC-LDPC codes, there are concerns about frame error rate guarantees.

High throughputs naturally allow the processing of a large amount of data, which provides the long blocklengths that allow capacity to be closely approached. What is needed is a way to harvest the ergodicity benefits of long blocklengths while somehow achieving the decoder complexity of a short-blocklength code. Feedback allows short blocklength codes to approach capacity, but such feedback is not practical in a high-throughput system.

Accordingly, a need exists for error control mechanisms which operate at high throughputs near capacity. The present disclosure fulfills that need and overcomes drawbacks to previous error control technologies.

BRIEF SUMMARY

In our prior work, it was demonstrated that capacity can be approached with short-blocklength convolutional codes and low-density parity-check (LDPC) codes that use simple ACK/NACK feedback controlling the transmission of additional incremental redundancy. In the present disclosure, short-blocklength codes are utilized to approach capacity with incremental redundancy, but without the need of feedback. A large number of short-blocklength codewords are transmitted and decoded in parallel. Incremental redundancy is delivered, without feedback, only to the decoders that need it.

A key concept of this technology is to translate a capacity-approaching performance of prior-art systems with feedback to a presently disclosed system that does not use feedback.

By way of example, and not of limitation, an embodiment of the technology described herein is a system that implements many capacity-approaching short-blocklength encoders and decoders in parallel that are coupled through common incremental redundancy. Source and channel coding delivers incremental redundancy only to the decoders that need it without requiring feedback. The amount of redundancy needed can be determined by central limit theorem arguments. Delivering that redundancy only to the parallel decoders that need it is equivalent to solving a specific problem in joint source-channel coding with side information available only at the receiver. At the receiver, side information comes from the parallel decoders that have already successfully identified their codewords. These parallel decoders provide this side information to the incremental redundancy decoder, which uses it to provide incremental redundancy to the parallel decoders that have not yet successfully identified their codewords. Several methods are disclosed to achieve this, including the prior-art method of Zeineddine and Mansour, "Inter-frame coding for broadcast communication. IEEE J. Select. Areas Commun, vol. 34, no. 2, February 2016, pp. 437-452," which was used to combat fading in a broadcast setting.

The disclosed technology uses many capacity-approaching short-blocklength codes in parallel to create a long-blocklength system without feedback. The performance of the technology of this disclosure is limited by that of the original short-blocklength code in a system with m rounds of non-active feedback.

Variable-length codes with average blocklengths of around 500 symbols can, with non-active feedback, closely approach capacity in theory and in practice. Variable-length codes, whose blocklengths vary through the use of incremental redundancy that is added only when needed, can achieve higher throughputs than fixed-blocklength codes for a specified average blocklength. Polyanskiy (Y. Polyanskiy, H. V. Poor, and S. Verdú. "Channel coding rate in the finite blocklength regime." IEEE Trans. Inf. Theory, 56(5):2307-2359, May 2010.) has established this analytically and in our prior work, we have also demonstrated this in practice with carefully designed variable-length codes and incremental redundancy transmissions having carefully designed lengths, used with feedback.

Thus, the present disclosure combines variable-length codes designed to approach capacity with short blocklengths with the ability to compress and encode incremental redundancy into a common pool of redundancy to produce a capacity-approaching system that does not require feedback but reaps many of the complexity benefits of short-blocklength codes.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

1. Introduction

This disclosure describes a new system to harvest the ergodicity benefits of long blocklengths while achieving the decoder complexity of a short-blocklength code by leveraging the performance of short-blocklength codes with incremental redundancy. This system can approach capacity at high throughputs while permitting strong guarantees on frame error rate (FER) performance.

Prior work considers both "active" and "non-active" feedback systems. Non-active feedback only tells the transmitter when to stop. At specific intervals in a feedback system, the receiver sends a message to the transmitter (an ACK or NACK) indicating whether or not more incremental redundancy is needed. This specification uses the parameter m to indicate the maximum number of ACK/NACK messages that can be sent before the system must give up on a transmission. After m transmissions, if the message cannot be decoded, it is considered an error.

Active feedback goes beyond indicating whether more redundancy is needed and instructs the transmitter about what information would be most useful for decoding. Active feedback, and especially its most extreme form of active sequential hypothesis testing, can dramatically improve performance at extremely short blocklengths, performing above the random coding bound, but at the cost of extreme complexity. However, important for the present disclosure, even non-active feedback systems can approach capacity for slightly longer average blocklengths. Non-active feedback systems can approach capacity with blocklengths on the order of 500 symbols. The present disclosure focuses on translating a non-active feedback system to a system that has no feedback.

Figure 1:
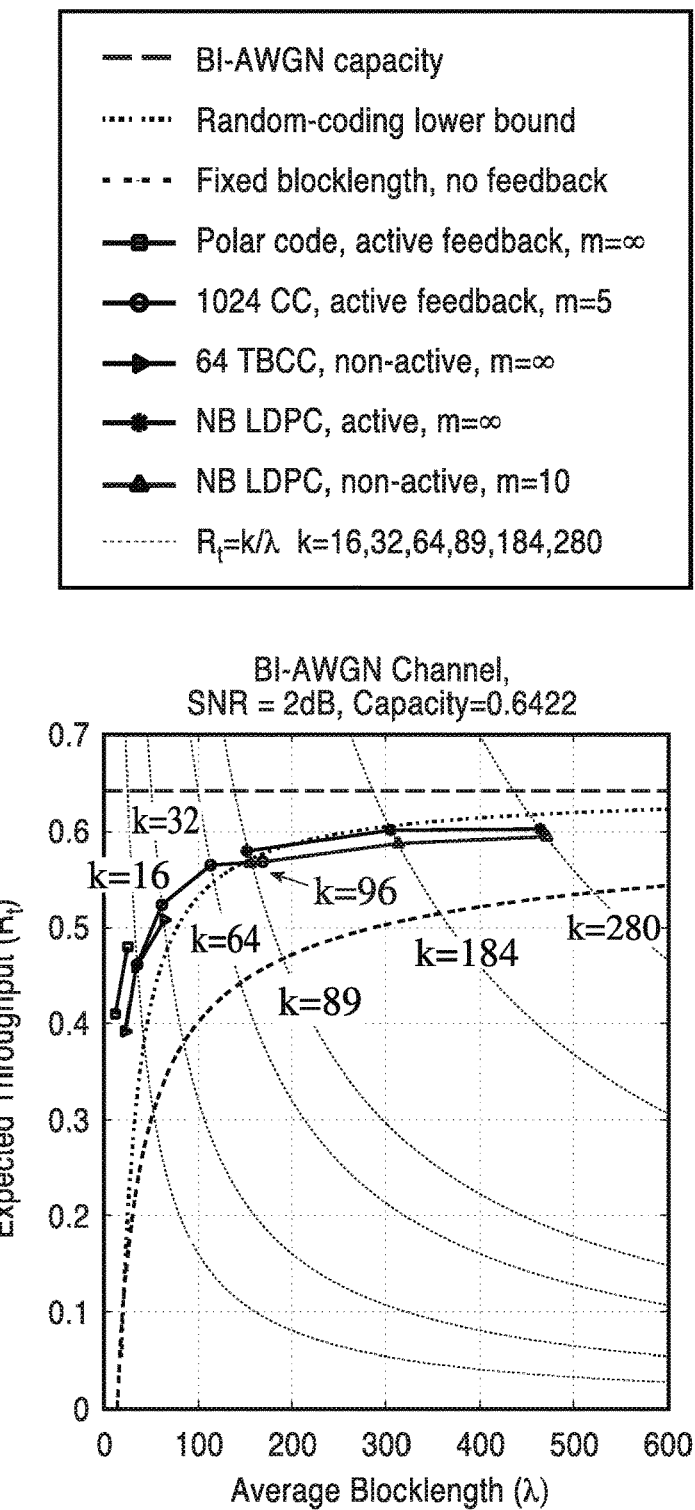
FIG. 1 is a plot of prior art feedback performance approaching capacity at short blocklengths using feedback.

FIG. 1 describes prior-art feedback performance for the example of a binary-input (BI) additive white Gaussian noise (AWGN) channel with frame error rate (FER) required to be less than $10^{-3}$. For a system transmitting k symbols at an average blocklength of $\lambda$, the throughput $R_t$ is defined by $R_t=k/\lambda$. For reference, FIG. 1 shows the curves of possible throughput $R_t$ as a function of $\lambda$ for some values of k. The performance characterization for fixed-blocklength codes is from the previously described Polyanskiy article, and is based on the normal approximation, which is shown in that reference to be accurate for blocklengths as small as 100 symbols.

The computation of the random coding lower bound on the performance of variable-length codes with feedback is based on the analysis from reference "Y. Polyanskiy, H. V.

Poor, and S. Verdu. Feedback in the non-asymptotic regime. IEEE Trans. Inf. Theory, 57(8):4903-4925, August 2011."

In FIG. 1, curves are shown with respect to the following references:

(a) "Y. Polyanskiy, H. V. Poor, and S. Verdu. Feedback in the non-asymptotic regime. IEEE Trans. Inf. Theory, 57(8):4903-4925, August 2011" This is reflected in the "Random-coding lower bound" line of the legend of FIG. 1.

(b) "Y. Polyanskiy, H. V. Poor, and S. Verdu. Channel coding rate in the finite blocklength regime. IEEE Trans. Inf. Theory, 56(5):2307-2359, May 2010." This is reflected in the "Fixed blocklength no feedback" line of the legend of FIG. 1.

(c) "A. R. Williamson, T.-Y. Chen, and R. D. Wesel. Firing the genie: Two-phase short-blocklength convolutional coding with feedback. In IEEE Inf. Theory and Application. Workshop, pages 1-6, San Diego, Calif., February 2013." This is reflected in the "1024 CC" line of the legend of FIG. 1.

(d) "A. R. Williamson, T.-Y. Chen, and R. D. Wesel. Variable-length convolutional coding for short blocklengths with decision feedback. IEEE Trans. Commun., 63(7):2389-2403, July 2015." This is reflected in the "64 TBCC" line of the legend of FIG. 1.

(e) "K. Vakilinia, A. R. Williamson, S. V. S. Raganathan, D. Divsalar, and R. D. Wesel. Feedback systems using non-binary LDPC codes with a limited number of transmissions. In IEEE Information Theory Workshop, pages 167-171, Hobart, Tasmania, Australia, November 2014." This is reflected in the "NB LDPC" lines of the legend of FIG. 1.

The curves of FIG. 1 show systems with feedback that closely approach the performance promised by the Polyanskiy reference listed earlier for "Feedback in the non-asymptotic regime" in the range of average blocklengths below 500 bits. For values of k=16, k=32, k=64, and k=89 these throughput results exceed Polyanskiy's random coding lower bound. As the average blocklength becomes larger, the random coding lower bound is more predictive.

The key point of FIG. 1 is that variable-length codes with feedback can approach capacity at very short blocklengths. In FIG. 1, the random-coding lower bound for a system with feedback is 0.27 dB from the Shannon limit for k=280 with a blocklength of less than 500 bits. Looking at implemented codes for k=280 in FIG. 1, the m=∞ non-binary LDPC (NB-LDPC) code is 0.53 dB from the Shannon limit. More importantly for the present disclosure, the NB-LDPC non-active feedback system in FIG. 1 that uses ten rounds of single-bit feedback still operates within 0.65 dB of the Shannon limit with an average blocklength of less than 500 bits.

Expressed another way, the m=10 non-binary LDPC (NB-LDPC) code achieves an $R_t$ value that is 93% of the Shannon capacity of the Bi-AWGN channel. The m=5 TBCC system achieves an $R_t$ value that is 82% of the Shannon capacity of the Bi-AWGN channel. From this it is seen that previously developed systems demonstrate that capacity can be approached with short-blocklength convolutional codes and LDPC codes that use simple ACK/NACK feedback controlling the transmission of additional incremental redundancy.

The present disclosure builds on prior approaches by using short-blocklength codes to achieve capacity with incremental redundancy, but departs from those approaches by not using feedback. In our "feedback-less system", a large number of short-blocklength codewords are transmitted and decoded in parallel. Incremental redundancy is delivered without feedback but still only to the decoders that need it.

As a simple example, consider two decoders that are operating in parallel with feedback. Assume that the transmitter knows statistically that one decoder will succeed in decoding and one will send feedback requesting the next segment of incremental redundancy. Instead of having the receiver send feedback, the transmitter can send the XOR of the two incremental redundancy transmissions, and the decoder that succeeds can remove its incremental part from the XOR so that incremental redundancy is available for the parallel decoder that needs it.

To further understand this feedback-less technology, consider incremental redundancy for a rate-compatible code delivered in a small number of segments of possibly varying length. The detailed embodiments below describe how minimal throughput is lost by restricting the redundancy to be delivered in a small number of segments, if the lengths of the segments are optimized using a previously-developed technique called sequential differential approximation. Embodiments of the present technology use many such codes in parallel. Each of the small number of segments has a corresponding decoding stage. To send the appropriate amount of redundancy for the next stage, the transmitter needs to know the minimum number of parallel decoders that will have succeeded in the previous stages. This can be estimated using the law of large numbers. It should be noted that the transmitter according to the present disclosure does not need to know (and cannot know without feedback) which of the parallel decoders have succeeded at each stage. Because the transmitter does not know which of the parallel decoders have succeeded, efficient communication requires that the transmitter encode across the incremental redundancy for all of the parallel decoders to produce a (compressed) transmission that is of the appropriate length for that stage. The incremental-redundancy decoder must have the ability to process the encoded incremental redundancy it receives from the transmitter, in order to produce soft reliability values for the incremental redundancy bits needed by the parallel decoders that have not yet successfully decoded.

According to an embodiment of our feedback-less technology, the amounts of incremental redundancy delivered at each stage can be carefully designed by utilizing central limit theorem (CLT) arguments that capture the probability of a certain number of decoders succeeding at each stage. Then, the present disclosure makes use of one of several possible techniques to deliver incremental redundancy at each stage only to the short-blocklength decoders that have not yet successfully decoded.

As described in embodiments below, one technique treats this specialized delivery of incremental redundancy as a code-design problem for a noisy channel that has independent and randomly varying side information that is only available at the receiver. This side information is produced by the short-blocklength decoders that have succeeded in earlier stages. Some of the parallel short-blocklength decoders may fail even after the final stage, and embodiments of the present disclosure utilize a packet-level erasure code to provide strong FER guarantees in the context of the well-understood behavior of the parallel decoders with incremental redundancy.

In the disclosed feedback-less technology, the many parallel short-blocklength codes are connected by the incremental-redundancy encoder and by a packet-level erasure code, both of which code across all the parallel codes. Thus, in the end, this is a fixed-to-fixed, long-blocklength system, and it is not surprising that it can approach capacity. What is special is that the decomposition allows capacity to be approached with low-complexity short-blocklength decoders and massive parallelism. The capacity-approaching ergodicity benefits of a long-blocklength code are obtained while still essentially using short-blocklength decoders.

2. Detailed Embodiments

The following describes embodiments of the technology, which are systems that approach capacity but that do not require any feedback but use short-blocklength codes that would work well in the context of a non-active feedback system. In particular, embodiments will use short blocklength codes that are variable-length in that they have m stages of incremental redundancy, $I_1, I_2, \ldots, I_m$, where m≥2. Embodiments use L such short-blocklength codes in parallel. It should be appreciated that some embodiments of the technology will have some of these L short blocklength codes be redundant in the sense that they are part of a fixed-rate packet-level erasure code that will allow successful decoding even when some of the short-blocklength codes cannot be decoded.

2.1 Encoding

The transmitter sends the initial transmission $I_1^{(1)}, I_1^{(2)}, \ldots, I_1^{(L)}$ for each of the L short-blocklength codes directly over the channel n the usual way. However, for the second stage and any later stages, the incremental redundancy associated with the L short-blocklength codes is combined and compressed to account for the fact that not all of the incremental redundancy is needed at the receiver because some of the L short-blocklength codes will have successfully decoded using only the earlier stages of incremental redundancy.

Thus, after the first stage, the transmitter sends symbols that are the result of an incremental redundancy encoder. For example, in the second stage of transmission the encoded incremental redundancy $F_2(I_2^{(1)}, I_2^{(2)}, \ldots, I_2^{(L)})$ is transmitted over the channel, where the encoder $F_2(\bullet)$ combines and compresses the incremental redundancy of the second stage of the short-blocklength codes. Thus, the full transmission of m stages of incremental redundancy for all L short-blocklength codewords, which we refer to as a superframe, is made up of $I_1^{(1)}, I_1^{(2)}, \ldots, I_1^{(L)}$ and $F_2(I_2^{(1)}, I_2^{(2)}, \ldots, I_2^{(L)}), \ldots, F_m(I_m^{(1)}, I_m^{(2)}, \ldots, I_m^{(L)})$.

It should be appreciated that the amount of information transmitted for each stage and thus the number of symbols transmitted for each stage need not be the same. In fact, it is expected that the number of symbols transmitted for each stage will be different both because the amount of incremental redundancy required by a single short-blocklength code will typically be different for different stages and because the number of short blocklength codes that require a stage of incremental redundancy decreases with each stage as more decoders successfully decode. However, the amount of information transmitted for each stage and thus for the superframe as a whole is a fixed value. It should be appreciated that the present disclosure is not a "rateless" code that provides a continuous stream of redundancy.

According to our feedback-less technology, the amount of information communicated in each stage of incremental redundancy is determined prior to transmission is implemented by the incremental redundancy encoder. This is in contrast to other systems which propose a "rateless" system that sends a continuous stream of random linear combinations until decoding is successful. Another difference between our disclosed feedback-less technology and these "rateless" systems is that the present disclosure uses a fixed-rate packet-level erasure code to allow decoding when some of the short blocklength codes cannot be decoded. Rateless systems explicitly do not use any additional fixed rate erasure coding in conjunction with their systems; and an additional fixed rate erasure code is not needed because the stream of random linear combinations continues indefinitely until decoding is successful.

2.2 Decoding

Figure 2:
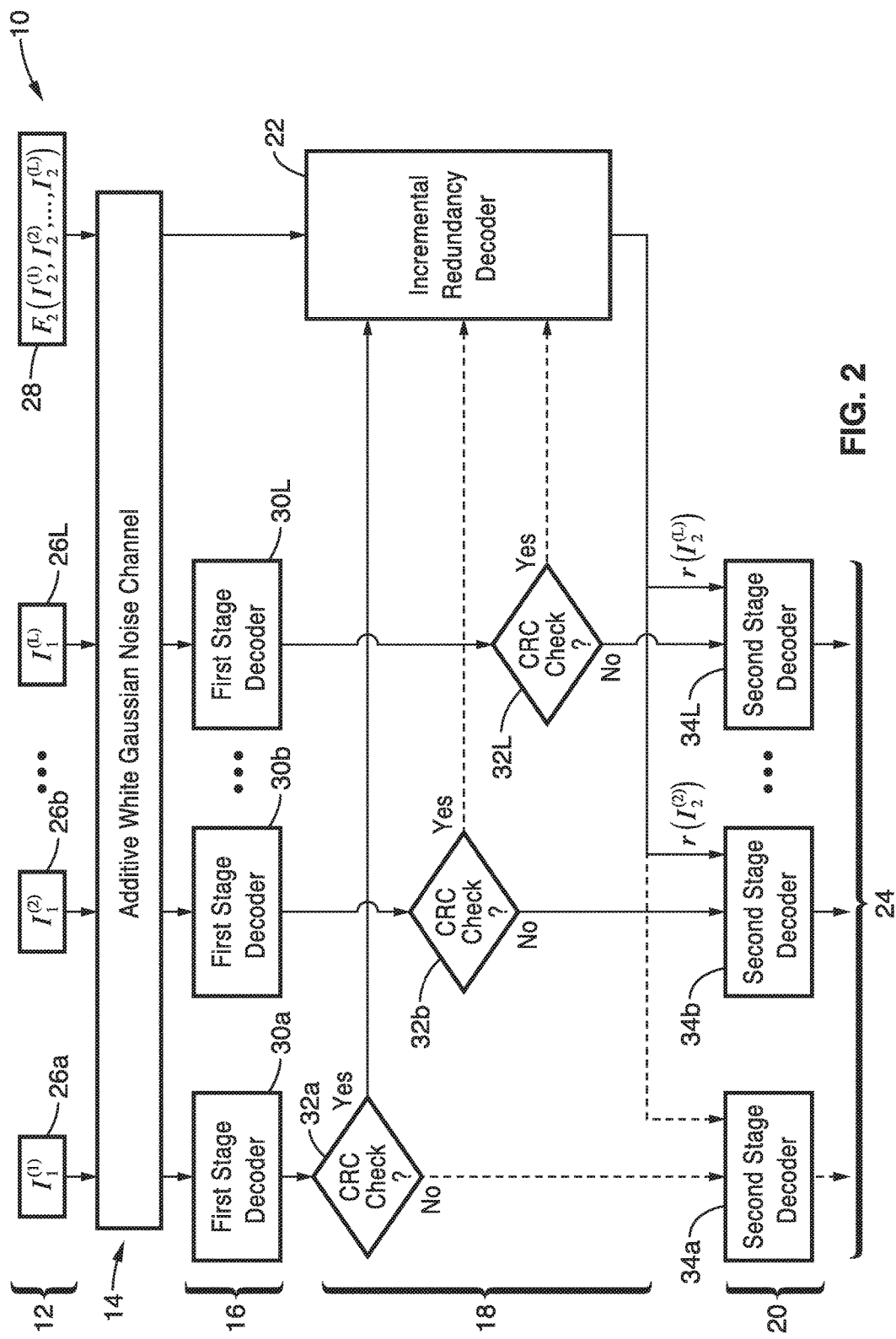
FIG. 2 is a block diagram of a decoder side utilizing numerous parallel independent decoders with incremental redundancy provided as needed in later stages, according to an embodiment of the present disclosure.

FIG. 2 illustrates an example embodiment 10 of a first stage of an m-stage decoder for the presented feedback-less technology. Dashed lines represent communication paths that are not utilized in this example but are potential paths for different cases when different sets of the parallel decoders succeed. Transmission begins by sending the first increments 12 $I_1^{(1)}, I_1^{(2)}, \ldots, I_1^{(L)}$ (26a, 26b, ..., 26L) through the channel, for example an AWGN channel 14 is depicted, coupled to the L parallel decoders 16. In addition $F_2(\bullet)$ 28 is shown as $F_2(I_2^{(1)}, I_2^{(2)}, \ldots, I_2^{(L)})$ coupled to channel 14. It will be appreciated that each row of elements shown here will be of length L, where L is chosen large enough that ergodicity causes the fraction of codes decoding to be well-behaved. Values of L such as 10,000 or even 100,000 could be used, but values as small as 1000 or 100 might be used in some systems. It will be appreciated that smaller values of L will require more powerful erasure coding and decrease throughput.

All L decoders 16 (30a, 30b, ..., 30L) perform the first stage of parallel decoding. Some of these parallel decoders will achieve successful decoding in the first stage, which is recognized by, for example a CRC check passing stage 18, shown with checks 32a, 32b through 32L. This is shown in the figure for the first parallel decoder, which is able to successfully decode using the initial transmission $I_1^{(1)}$. If the CRC check passes, then the incremental redundancy decoder 22 is utilized, otherwise a second decoder stage 20 is utilized, as shown with decoders 34a, 34b, ..., 34L. Output from the Incremental redundancy decoder is coupled to the second stage decoders. Output 24 is shown from the second stage decoders.

For these codewords for which the CRC check passes, the later stages of decoding are not needed and are not performed. The successful parallel decoders can use the decoded message to compute $I_2^{(1)}$ and provide it as side information to the incremental-redundancy decoder. Thus, the incremental-redundancy decoder has access to some of the message bits that were the inputs to the encoder $F_2(\bullet)$. This is shown in the figure where the first decoder provides $I_2^{(1)}$ to the incremental-redundancy decoder.

It should be appreciated that for the overall system to accomplish its goal, $F_2(\bullet)$ performs both source and channel coding functions because it is compressing the set of increments $I_2^{(1)}, I_2^{(2)}, \ldots, I_2^{(L)}$ based on the amount of side information that will be available at the receiver and it is preparing the compressed information for transmission over the channel. However, in order to achieve the overall system goal of replicating the performance of the short-blocklength codes used with feedback, it is not necessary that the incremental-redundancy decoder recover the increments $I_2^{(i)}$ perfectly. Rather, what is needed is to deliver to the second-stage decoders reliability information about the increments $I_2^{(i)}$ that is similar (in quality) to the reliability information that would have been received if these increments had been transmitted directly over the channel.

The incremental-redundancy decoder, which will be discussed at length below, uses the encoded incremental redundancy $F_2(I_2^{(1)}, I_2^{(2)}, \ldots, I_2^{(L)})$ transmitted over the channel and the side information provided by the successful decoders to provide reliabilities for $I_2^{(i)}$ to the decoders that were not successful in the first stage. This is shown in the figure where the incremental-redundancy decoder provides the reliabilities $r(I_2^{(2)})$ and $r(I_2^{(L)})$ to the second and Lth decoders, respectively. In the second stage, for example, the second decoder can now attempt decoding based on both reliabilities from the initial transmission $r(I_1^{(2)})$ and from the incremental redundancy $r(I_2^{(2)})$. This process continues for m stages. Even after all m stages of decoding are completed, some decoders may still not have succeeded.

Although not depicted in FIG. 2, it is important to understand that in the overall system, it is the final packet-level erasure decoding step that will recover the super-frame despite the failure of a small number of the decoders even after the final stage. Some embodiments might be satisfied with the failure of a small number of the parallel decoders and forego the packet-level erasure decoding.

2.3 Determining how Many Decoders Will Succeed at Each Stage

To manage the flow of incremental redundancy (i.e., to determine how much information should be transmitted at each stage) without feedback, the present disclosure makes use of the power of the Gaussian approximation introduced on the rate that a channel can support at finite blocklength.

According to a Gaussian approximation, information density $i(X,Y)$ is defined as $$i(X, Y) = \log_2 \frac{f_{Y|X}(y|x)}{f_Y(y)}. \tag{1}$$

The expected value of $i(X,Y)$ is the capacity of the channel. For the example of a BI-AWGN channel with noise $z_k$, $i(X,Y) = 1 - \log_2(1 + e^{-2(z_k+1)\sigma^2}) = i(z_k)$. The accumulated information density $I_S$, at the receiver at time $N_S$ of successful decoding is $$I_S = \sum_{k=1}^{N_S} i(z_k). \tag{2}$$

It will be noted that Eq. (2) is a sum of independent random variables for which the central limit theorem converges quickly to a normal distribution, leading to the normal approximation. An important consideration for the present disclosure is whether the rate at which a practical decoder succeeds also follows such a normal distribution.

Figure 3:
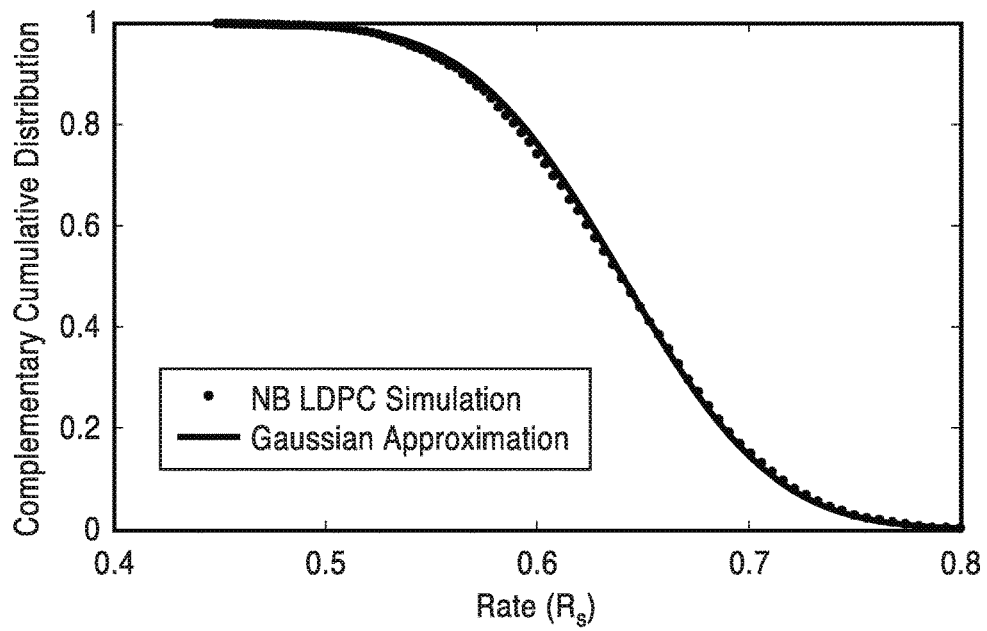
FIG. 3 is a plot of empirical complementary cumulative distribution function (c.d.f.) and the Gaussian approximation (Q-function) corresponding to the rate $R_S$ at which the NB-LDPC code was able to decode successfully.

FIG. 3 depicts complementary cumulative distribution. Although originally computed for a system with feedback, the plot indicates that the answer to this question is in the affirmative. The figure shows that for a short-blocklength NB-LDPC code used by K. Vakilinia, A. R. Williamson, S. V. S. Raganathan, D. Divsalar, and R. D. Wesel in "Feedback systems using non-binary LDPC codes with a limited number of transmissions". In IEEE Information Theory Workshop, pages 167-171, Hobart, Tasmania, Australia, November 2014; the empirical complementary cumulative distribution function on the rate at which decoding is successful is very closely approximated by a Gaussian distribution for this example of the BI-AWGN channel with SNR of 2 dB. Similarly, accuracy of the Gaussian approximation to predict the rate at which decoding is successful has been confirmed for similar NB-LDPC codes in higher-SNR AWGN channels that require larger constellations and in fading channels with channel state information known at the receiver.

In FIG. 3 one can see that $R_S$ is well-approximated by a Gaussian with mean $\mu_S = E[R_S]$ and variance $\sigma_S^2 = Var(R_S)$:

$$f_{R_S}(r) = \frac{1}{\sqrt{2\pi\sigma_S^2}} e^{-\frac{(r-\mu_S)^2}{2\sigma_S^2}}. \tag{3}$$

The accuracy of the normal approximation allows the prediction at specified blocklengths of how many decoders have succeeded and how many will need further incremental redundancy. The cumulative distribution function (c.d.f.) of $N_S$, the blocklength at which decoding is successful, is $F_{N_S}(n) = P(N_S \leq n) = 1 - F_{R_S}(k/n)$. Taking the derivative of $F_{N_S}$ using the Gaussian approximate on of $F_{R_S}$ produces the following "reciprocal-Gaussian" approximation for the probability density function (p.d.f.) of $N_S$:

$$f_{N_S}(n) = \frac{k}{n^2 \sqrt{2\pi\sigma_S^2}} e^{-\frac{(k/n-\mu_S)^2}{2\sigma_S^2}}. \tag{4}$$

For incremental redundancy to be employed without feedback, the present disclosure must break the communication into a number of distinct transmissions (stages) of incremental redundancy. In order to determine how much information to transmit for each stage, the transmitter needs to know what fraction of the parallel short-blocklength decoders will need incremental redundancy at each stage because they have not yet decoded successfully.

The number of incremental transmissions is limited to m, with the increments $\{I_1, I_2, \ldots, I_m\}$ being introduced in a previous section. It should be noted that the cumulative blocklength $N_j$ at the jth stage is simply the sum of the first j increment lengths. Using the p.d.f. of $N_S$ from Eq. (4), ideas are used from the articles above from Vakilinia, Williamson, Raganathan, Divsalar, and Wesel, which were originally intended for feedback systems to compute the probability that each decoder will require a particular incremental transmission at a particular stage even when feedback is not available. For $N_j < N_{j+1}$, the probability of a successful decoding attempt at blocklength $N_{j+1}$ but not at $N_j$ is $$\int_{N_n}^{N_{j+1}} f_{N_S}(n) dn = \int_{N_n}^{N_{j+1}} \frac{k}{n^2 \sqrt{2\pi\sigma_S^2}} e^{-\frac{(k/n-\mu_S)^2}{2\sigma_S^2}} dn = Q\left(\frac{k/N_{j+1} - \mu_S}{\sigma_S}\right) - Q\left(\frac{k/N_j - \mu_S}{\sigma_S}\right) \tag{5}$$

The disclosed feedback-less technology combines the ability to accurately compute this probability using the approximation of Eq. (5) or, without deviating from the scope of the present disclosure, a different approximation with the use of the ergodicity of many parallel decoders to manage the flow of incremental redundancy. This is a core concept of this technology.

2.4 Optimizing the Blocklengths $\{N_1, N_2, \ldots, N_m\}$

Separately, the tight Gaussian approximation discussed above facilitates, as described by the above article of Vakilinia, Williamson, Raganathan, Divsalar, and Wesel, which was originally for feedback systems, the optimization of the sequence of blocklengths $\{N_1, N_2, \ldots, N_m\}$ to maximize the throughput. The throughput is defined as $R_t = E[K]/E[N]$, where $E[N]$ represents the expected number of channels used and $E[K]$ is the effective number of information bits transferred correctly over the channel. The expression for $E[N]$ is $$E[N] = \qquad (6)$$
$$N_1 Q\left(\frac{k/N_1 - \mu_S}{\sigma_S}\right) + \sum_{j=2}^{m} N_j \left[ Q\left(\frac{k/N_j - \mu_S}{\sigma_S}\right) - Q\left(\frac{k/N_{j-1} - \mu_S}{\sigma_S}\right) \right] +$$
$$N_m \left[ 1 - Q\left(\frac{k/N_m - \mu_S}{\sigma_S}\right) \right]$$

The first term shows the contribution to the expected blocklength from successful decoding on the first attempt. The term $$Q\left(\frac{k/N_1 - \mu_S}{\sigma_S}\right)$$

is the probability of decoding successfully with the initial block of $N_1$. Similarly, the terms in the summation are the contributions to the expected blocklength from decoding that is first successful at total blocklength $N_j$ (at the jth decoding attempt). Finally, the contribution to expected blocklength from not being able to decode even at $N_m$ is $$1 - Q\left(\frac{k/N_m - \mu_S}{\sigma_S}\right).$$

Even when the decoding has not been successful at $N_m$, the channel has been used for $N_m$ channel symbols. The expected number of successfully transferred information bits $E[K]$ is $$E[K] = k Q\left(\frac{k/N_m - \mu_S}{\sigma_S}\right), \qquad (7)$$

where $$Q\left(\frac{k/N_m - \mu_S}{\sigma_S}\right)$$

is the probability of successfully decoding. It should be appreciated that $E[K]$ depends only upon $N_m$. In fact, $E[K] \approx k$ and is not sensitive to specific choice of $N_m$ for reasonably large values of $N_m$.

The initial blocklength is $N_1$ and we seek the optimal blocklengths $\{N_1, N_2, \ldots, N_m\}$ to maximize the throughput. Over a range of possible $N_1$ values, a technique we call sequential differential optimization (SDO), introduced in the previously cited Vakilinia, Williamson, Raganathan, Divsalar, and Wesel article as sequential differential approximation in the context of systems using feedback, selects $\{N_1, N_2, \ldots, N_m\}$ to minimize $E[N]$ for each fixed value of $N_1$ by setting derivatives to zero as follows:

$$\left\{ N_1, N_2, \ldots, N_m : \frac{\partial E[N]}{\partial N_j} = 0, \forall j = 1, \ldots, m-1 \right\} \qquad (8)$$

The principle of sequential differential optimization is that for each $j \in \{2, \ldots, m\}$ the optimal value of $N_j$ is found by setting $$\frac{\partial E[N]}{\partial N_{j-1}} = 0$$

yielding a sequence of relatively simple computations. This can be applied to any p.d.f. for $N_S$, and the p.d.f. of Eq. (4) should be considered as one example of the principle. The disclosed technique selects an integer value of $N_j$ that approximates the real-numbered value of $N_j$ that makes the previous choice of $N_{j-1}$ optimal in retrospect.

For $j=2$, $$\frac{\partial E[N]}{\partial N_{j-1}}$$

depends only on $\{N_{j-1} = N_1, N_j = N_2\}$ as follows:

$$\frac{\partial E[N]}{\partial N_1} = Q\left(\frac{\frac{k}{N_1} - \mu_S}{\sigma_S}\right) + (N_1 - N_2) Q'\left(\frac{\frac{k}{N_1} - \mu_S}{\sigma_S}\right)$$

Thus, the system then solves for $N_2$ as $$N_2 = \frac{Q\left(\frac{\frac{k}{N_1} - \mu_S}{\sigma_S}\right) + N_1 Q'\left(\frac{\frac{k}{N_1} - \mu_S}{\sigma_S}\right)}{Q'\left(\frac{\frac{k}{N_1} - \mu_S}{\sigma_S}\right)}$$

For $j > 2$, $$\frac{\partial E[N]}{\partial N_{j-1}}$$

depends only on $\{N_{j-2}, N_{j-1}, N_j\}$ as follows:

$$\frac{\partial E[N]}{\partial N_{j-1}} = \qquad (9)$$
$$Q\left(\frac{k/N_{j-1} - \mu}{\sigma}\right) + (N_{j-1} - N_j) Q'\left(\frac{k/N_{j-1} - \mu}{\sigma}\right) - Q\left(\frac{k/N_{j-2} - \mu}{\sigma}\right).$$

Thus, the system then solves for $N_j$ as $$N_j = \frac{Q\left(\frac{k/N_{j-1}-\mu}{\sigma}\right) + N_{j-1}Q'\left(\frac{k/N_{j-1}-\mu}{\sigma}\right) - Q\left(\frac{k/N_{j-2}-\mu}{\sigma}\right)}{Q'\left(\frac{k/N_{j-1}-\mu}{\sigma}\right)}. \quad (10)$$

For each possible value of $N_1$, SDO can be used to produce an infinite sequence of $N_j$ values that solve Eq. (8). It should be appreciated that the SDO equations produce real numbers while the actual sequence lengths must be integers, so the values are rounded or alternatively handled, and by considering the floor and ceiling at each step of the optimization, the tree of possible integer values can be explored.

The resulting sequence is an optimal sequence of increment lengths for a given density of points in time, where each point is a decoding attempt on the axis of transmission time. As $N_1$ increases, the density of decoding attempts decreases, lowering system complexity. Using SDO to compute the optimal m decoding points is equivalent to selecting the most dense SDO-optimal sequence that when truncated to m points still meets the frame error rate target.

Figure 4:
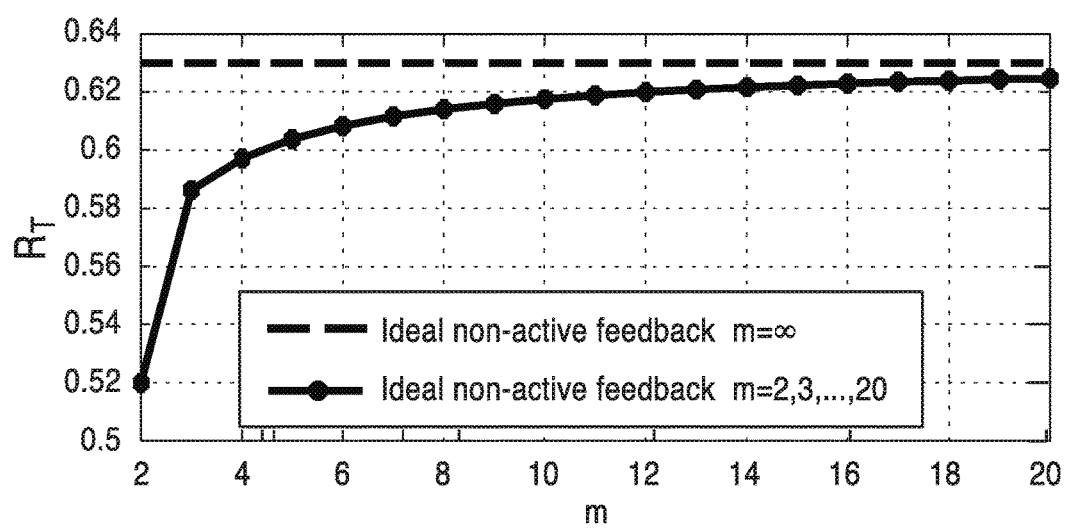
FIG. 4 is a plot of throughputs as a function of the number m of incremental transmissions permitted.

FIG. 4 depicts resulting throughputs obtained by using SDO to find the optimal increment lengths for values of m in the range of $2 \leq m \leq 20$ for the target FER of $10^{-3}$ for the NB-LDPC code from the previously cited Vakilinia, Williamson, Raganathan, Divsalar, and Wesel article for k=96 message bits. The figure illustrates that with m=10 decoding points, a system can closely approach the performance of a system that has m=∞, which is a system that attempts decoding after every received symbol.

2.5 Performance Guarantees for Parallel Decoders

To provide shared incremental redundancy to the multiple independent short-blocklength decoders, it is preferable that enough overall redundancy is provided to the system at each stage. Sequential differential optimization (SDO) can specify the sizes of the incremental redundancy transmissions. Additionally, for each incremental-redundancy stage, there is an associated probability of successful decoding based on the Gaussian approximation from Eq. (5), which is quite accurate. Again, other p.d.f.s for $N_S$ could be used without deviating from the scope of the present disclosure. This probability leads directly to the expected value of the number of frames that decode correctly at that stage.

The embodied transmitter of the disclosure also preferably considers the variation around that expected value. The overall approach of this disclosure is related to product coding, and to motivate this approach we follow the example of Elias' early work on product codes (P. Elias. Error-free coding. Transactions of the IRE Professional Group on Information Theory, 4(4):29-37, 1954.) and use arguments based on the binomial cumulative distribution. Suppose that a super-frame is composed of L=1000 frames (1000 short-blocklength codes) and the expected number of successfully decoded frames after the initial transmission $I_1$ is 200 out of 1000. Define the length of the incremental redundancy transmission $I_2$ to be $\ell(I_2)$ bits. At least 800 $\ell(I_2)$ bits need to be received to allow the remaining decoders to proceed to the next stage. However, there is a significant probability that fewer than 200 decoders will succeed. In order to meet an overall frame error probability of $10^{-15}$ with ten stages of redundancy, each stage needs to have a failure rate of less than $10^{-16}$. Noting that the cumulative of the binomial with 1000 trials and probability of stage-1 success $P(i \in S_1)=0.2$ is equal to $9.6 \times 10^{-17}$ for 103 or fewer successes, incremental redundancy needs to be provided for 1000-103=896 of the 1000 frames. A similar analysis indicates that in a later stage when the expected total number of successes is 800, incremental redundancy should be provided for 310 decoders since the cumulative of the binomial with 1000 trials and p=0.8 is equal to $7.1 \times 10^{-17}$ for 689 or fewer successes. Thus, there is some overhead (in additional incremental redundancy) associated with not knowing exactly how many decoders need additional incremental redundancy.

However, it is important to note that this additional redundancy is required by only about a tenth of the decoders and that most of the blocklength is in the initial transmission $I_1$; therefore, this overhead represents a relatively small fraction (typically below 3%) of the overall transmission length.

Consider the example of using the NB-LDPC with feedback code for k=280 whose performance was shown in FIG. 1. Table 1 provides the increments $I_j$ computed by SDO, the cumulative blocklengths $N_j$, and the probability of successful decoding at each stage. Using these parameters, the binomial analysis described above results in an overhead of 2.6% for 1000 decoders in parallel. The initial transmission of 428 bits, which does not contribute to this overhead, is much larger than the subsequent incremental transmissions; which aids in keeping the overhead small. Of course, as more parallel decoders are employed the distribution concentrates further. For example, if 10,000 decoders are utilized in parallel then the overhead drops to 0.8%. Relaxing the FER requirement also reduces overhead. For an overall FER of $10^{-6}$, requiring each stage to have FER $10^{-7}$, the overhead for 1000 parallel decoders is 1.6%.

The discussion above only ensures that the incremental redundancy would be provided to each short-blocklength code as if it were providing feedback to the transmitter. The short-blocklength codes shown in FIG. 1 for the NB-LDPC code with m=10 achieve a modest FER of $10^{-3}$ with an average blocklength of 500 bits. However, the present disclosure seeks frame error rates well below $10^{-3}$. Including a packet-level erasure code can allow extremely low superframe FERs even with a frame FER of $10^{-3}$. As an example, for a 1000-frame super-frame with each individual frame failing with a probability of $10^{-3}$, an erasure code that can correct sixteen erased frames yields a super-frame failure rate of $1.0 \times 10^{-15}$, obtained by subtracting the binomial cumulative distribution function for sixteen or fewer failures in 1000 trials with a failure probability of $10^{-3}$.

Because of the CRC in each frame, failures will appear as erasures at the receiver. Relatively short CRCs can still ensure that the undetected error probability is well below $10^{-16}$ by incorporating, for example, the codeword structure into the design of the CRC as described by C. Y. Lou, B. Daneshrad, and R. D. Wesel in "Convolutional-code-specific CRC code design. IEEE Trans. Commun., 63(10): 3459-3470, October 2015. The simulation results in FIG. 1 for the m=10 NB-LDPC system operating 0.65 dB from capacity already includes the overhead of an 8-bit CRC used to identify frames that require additional redundancy.

It should be appreciated that the CRC check is only one method for determining that a short-blocklength frame has been received. Other techniques for determining that a frame has been successfully received can be employed and still not deviate from the scope of the present disclosure. One such example is the reliability-output Viterbi algorithm that was employed by Williamson in the previously described article "Variable-length convolutional coding for short blocklengths with decision feedback".

2.6 Utilizing Successful Decoder Data

One aspect of the present disclosure is a system that delivers incremental redundancy to the parallel decoders that need it without wasting transmission symbols providing redundancy to parallel decoders that have already succeeded. Using, for example, the Gaussian approximation, the amount of incremental redundancy required at each stage can be established as discussed above. The following discusses how to ensure that the incremental redundancy can be accessed by exactly the decoders that need it.

Figure 5:
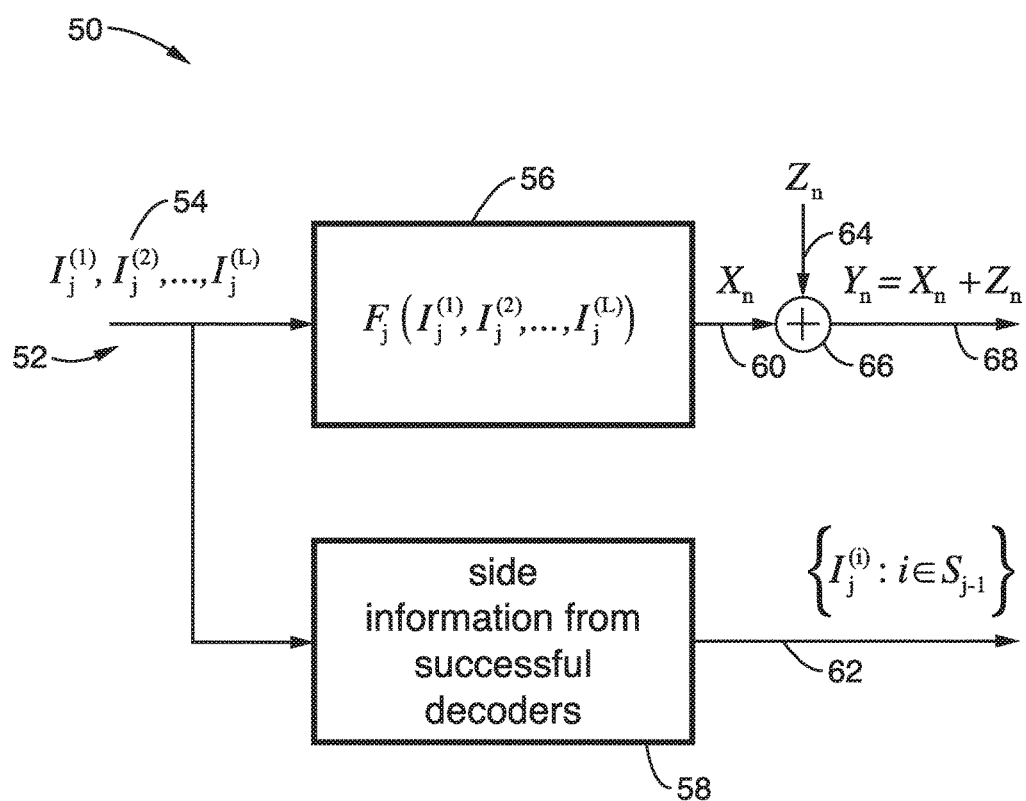
FIG. 5 is a block diagram of encoded incremental redundancy with side information from successful decoders, according to an embodiment of the present disclosure.

FIG. 5 illustrates an embodiment 50 showing how information about the needed incremental redundancy is provided to the incremental redundancy decoder. Incremental redundancies 54 are seen at input 52 of the decoder, shown with parallel decoders 56, with $X_n$ output 60, summed with which is summed with $Z_n$ 64 at junction 66, to output $Y_n = X_n + Z_n$ 68. Side information from successful decoders is seen processed 58 and outputting $\{I_j^{(i)} : i \in S_{j-1}\}$ 62. The transmitter encodes the incremental redundancies of stages $j \geq 2$ for each of the parallel decoders with the encoding functions $F_j(I_j^{(1)}, I_j^{(2)}, \ldots I_j^{(L)})$ that produce the sequence of transmission symbols $\{x_n\}$. Upon decoding at (the previous) stage $j-1$, the L parallel decoders divide into two sets, the successful decoders $S_{j-1} \subset \{1, \ldots, L\}$ and the unsuccessful decoders $U_{j-1} \subset \{1, \ldots, L\}$. The incremental-redundancy decoder uses $\{y_n\}$, which is the noisy version of the transmitted sequence $\{x_n\}$, and the side information of $\{I_j^{(1)} : i \in S_{j-1}\}$ to produce reliability values for $\{I_j^{(1)} : i \in U_{j-1}\}$. As discussed above, the number of successful decoders (decoders in $S_j$) increases with j so that more side information is revealed. Thus, the function $F_j(\bullet)$ can send proportionally fewer symbols $x_n$. As discussed above, the number of decoders that need to have incremental redundancy at each stage can be accurately predicted to ensure a specified target super-frame error rate. The following now describes the structure of the encoder $F_j(I_j^{(1)}, I_j^{(2)}, \ldots, I_j^{(L)})$ and how its symbols, together with the side information $\{I_j^{(1)} : i \in S_{j-1}\}$, are used to produce the needed reliability values.

2.7 Lossy Source Coding Approach to Incremental Redundancy Encoder

The goal of the incremental-redundancy decoder is to provide reliabilities to the parallel decoders that have not yet successfully decoded. Because the bits of the increments $\{I_j^{(i)} : i \in U_{j-1}\}$ do not need to be recovered exactly, this is essentially a lossy coding problem. For this set-up of lossy transmission of a source over a channel with side information about the source, source coding (with side information) followed by channel coding has been shown to be optimal (e.g., article S. Shamai, S. Verdu, and R. Zamir. Systematic Lossy Source/Channel Coding. IEEE Trans. Inf. Theory, 44(2): 564-579, March 1998). Hence, using the separation of source and channel coding to neglect for a moment the noisy channel $y=x+z$, consider the problem of lossy source coding of $I_j^{(1)}, I_j^{(2)}, \ldots, I_j^{(L)}$ with side information $\{I_j^{(i)} : i \in S_{j-1}\}$. Let the source x be the bits of $\{I_j^{(1)}, I_j^{(2)}, \ldots, I_j^{(L)}\}$ and the side information Y being the result of passing x through an erasure channel with erasure probability p equal to the probability that a decoder is unsuccessful at stage $j-1$.

The rate distortion function for source coding with side information at the decoder was established in general by Wyner and Ziv in article "The Rate-Distortion Function for Source Coding with Side Information at the Decoder. IEEE Trans. Inf. Theory, 22(1):1-10, January 1976." Verdu and Weissman and Perron et al. (S. Verdu and T. Weissman. "The Information Lost in Erasures." IEEE Trans. Inf. Theory, 54(11):5030-5058, November 2008, and E. Perron, S. Diggavi, and I. E. Telatar. "Lossy Source Coding with Gaussian or Erased Side-Information". In Proc. IEEE Int. Symp. Inform. Theory, pages 1035-1039, June 2009.) considered the specific case of side information Y that is an erased version of the source X. For our research, the key result from Verdu and Weissman is Theorem 18 (see also Theorem 1 of the Perron and Diggavi article), which considers any source X taking values in a discrete set X with distortion measure $d: \chi \times \chi \to R^+$ and side information Y being an erased version of X with erasure probability p. The rate distortion function with this erasure-channel side information is $$R_{X|Y}(D) = pR_X(D/p) \tag{11}$$

where $R_X(\bullet)$ is the rate distortion function for the original source X without side information.

In order to translate the performance of a feedback system to the system of the present disclosure without feedback, the receiver must produce reliability information about the incremental redundancy that is comparable or better than would have been achieved by simply transmitting the incremental redundancy bits over the noisy channel (as would have been performed in the feedback case); the latter would have been done following a request for these incremental redundancy bits by a NACK in the feedback system. Let the distortion for the incremental redundancy bits for unsuccessful decoders in stage $j-1$ transmitted directly over the channel be $D_U$.

In the standard problem formulation in the articles of Verdu and Weissman, Perron and Diggavi, as well as that of A. D. Wyner and J. Ziv. "The Rate-Distortion Function for Source Coding with Side Information at the Decoder" IEEE Trans. Inf. Theory, 22(1):1-10, January 1976., the side information values of X for the successful decoders are included in the distortion computation. The distortion of the X values for the redundancy bits meant for the successful decoders is $D_S = 0$ for any useful distortion measure since they are provided perfectly as side information. Thus, in the example where the erasure probability is p we need the overall distortion to be $$D = pD_U + (1-p)D_S = pD_U \tag{12}$$

to ensure that the incremental bits for the unsuccessful decoders have the desired distortion of $D_U$. Looking again at $R_{X|Y}(D)$ of Eq. (11), we find that the result simplifies to $pR_X(D_U)$ so that, not surprisingly, the overall rate required is simply the original rate distortion function (without side information) multiplied by the fraction of bits that were not already provided as side information. Thus, information theory confirms that it is possible to provide a source coding solution that allows recovery of the incremental bits of the unsuccessful decoders with the same distortion and the same rate as would have been possible if we knew at the transmitter which bits were required by the unsuccessful decoders.

To see this, consider applying this source coding theorem to a large number L of parallel decoders without feedback and comparing the amount of redundancy transmitted to those same L decoders operating with feedback. Suppose that we are at a stage where the probability that each decoder requires incremental redundancy is p. For the system with feedback, the expected total amount of redundancy over the L decoders is $Lp \ell (I_j) R_X(D_U)$, and as we have L decoders times the probability p that they require feedback times $\ell (I_j) R_X(D_U)$ bits per decoder that sends a NACK. For the L parallel decoders without feedback, Theorem 18 from the previously cited S. Verdu and T. Weissman ("The Information Lost in Erasures") also yields $L \ell (I_j) pR_X(D_U)$ for the resulting source coding with side information problem.

One appropriate distortion metric for the likelihoods of the incremental redundancy is log loss distortion. Since the rate distortion function for log loss distortion is H(X)–D, and the expected distortion obtained from transmitting X directly on the channel is H(X|Y) we arrive at the result that the best possible compression of the incremental redundancy to achieve the same log loss distortion as would have been obtained by transmitting the bits directly on the channel is exactly the channel capacity H(X)–H(X|Y).

Thus, as with the well-known case of compressing a Gaussian source under squared-error distortion and transmitting it over the Gaussian channel, there is no benefit asymptotically in the case with feedback to separate compression and channel coding of incremental redundancy over simply transmitting the redundancy directly on the channel. However, source coding is one valid approach for compressing the incremental redundancy for the system without feedback, in view of the side information that will be available at the receiver. Log-loss distortion is one possible distortion metric for this source coding approach. One aspect of using numerous parallel decoders is that there are enough incremental bits to make source coding a practical possibility, as has been noted by various researchers.

2.8 Joint Source-Channel Approaches

While separation of source and channel coding is an optimal approach from the perspective of information theory, embodiments of the present disclosure can also use multiple joint source-channel approaches that have practical appeal to solving the problem of providing the reliabilities of incremental redundancy bits for the unsuccessful decoders at each stage in an efficient manner.

Tornado Codes, LT Codes, and Raptor Codes all address coding for erasures, but focus on the noiseless erasure channel. We note in particular the discussion of Tornado Codes (M. G. Luby, M. Mitzenmacher, M. A. Shokrallahi, and D. A. Spielman. "Efficient erasure correcting codes." IEEE Trans. on Info. Th., 47(2): 569-584, February 2001) for which the case of erasures only to systematic bits (on an otherwise noiseless channel) was considered and referred to as the partial-erasure channel (A. Shokrollahi in "Raptor codes." IEEE Trans. on Info. Th., 52(6):2551-2567, June 2006.). Under the partial erasure channel model, systematic bits and linear parity bits (typically in multiple stages) are both transmitted, but only systematic bits are erased. In these works, only the noiseless erasure channel is considered whereas the situation of the present disclosure includes an AWGN channel.

Figure 6:
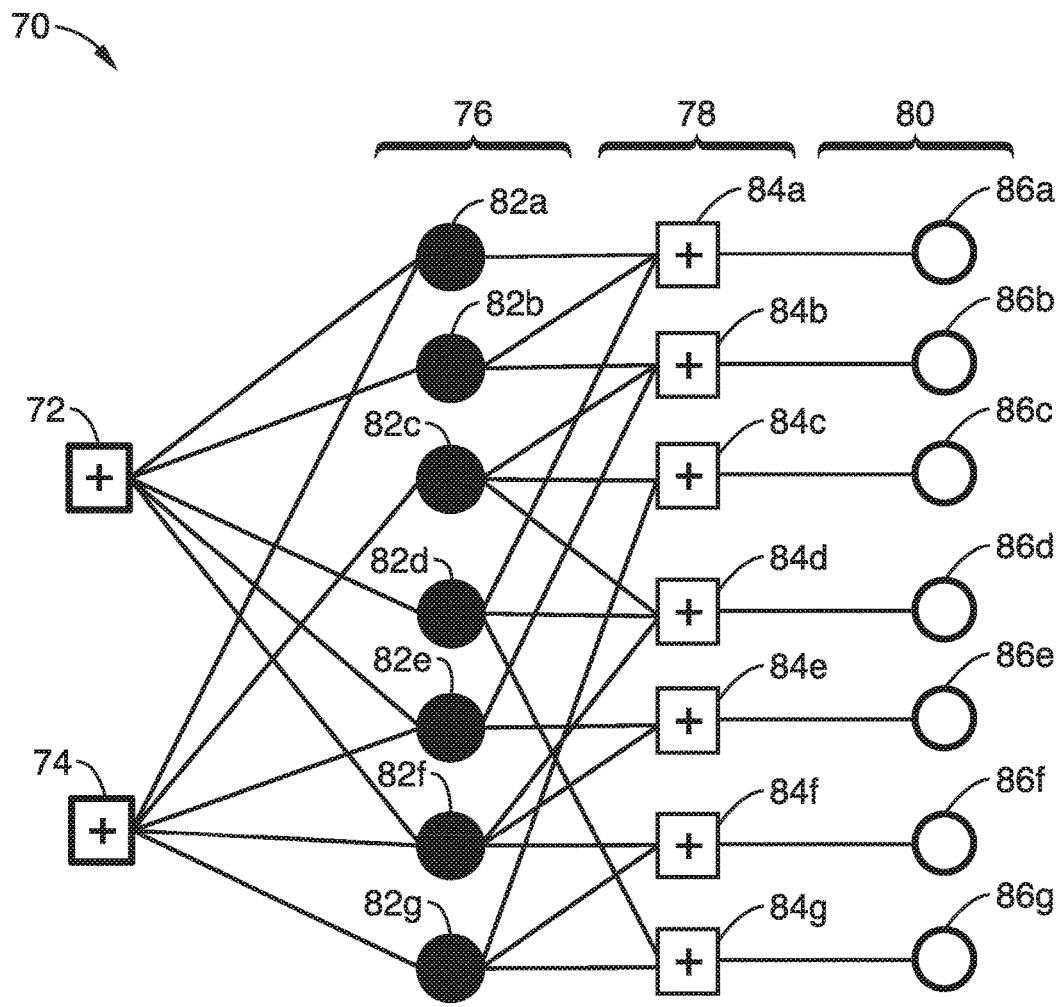
FIG. 6 is a Raptor-like protograph for a two-mode channel, according to an embodiment of the present disclosure.

Protograph-based codes and in particular protograph-based Raptor-like (PBRL) LDPC codes for the AWGN channel can be designed for the two-mode channel that is created by the proposed system. As shown in FIG. 6, in this two-mode channel, the incremental bits themselves (or "precoded" versions of these bits) are effectively transmitted through an erasure channel (where erasures correspond to unsuccessful decoders), while the linear combinations of these precoded bits are transmitted over the AWGN channel. As in the article from T.-Y. Chen, K. Vakilinia, D. Divsalar, and R. D. Wesel, "Protograph-based raptor-like LDPC codes", IEEE transactions on communications. IEEE Trans. Commun., 63(5):1522-1532, May 2015, the reciprocal channel approximation (RCA) algorithm as discussed by S. Y. Chung in "On the construction of some capacity-approaching coding schemes." PhD thesis, MIT, Cambridge, Mass., 2000, and by D. Divsalar, S. Donlinar, C. R. Jones, and Kenneth Andrews in "Capacity-approaching protograph codes." IEEE J. Sel. Areas Commun., 27, No. 6:876-888, August 2009 can be used to guide the design of the protograph. RCA provides a fast and accurate approximation to the density evolution algorithm originally proposed by Richardson et al. in T. J. Richardson and R. L. Urbanke. "The capacity of low-density parity-check codes under message passing decoding." IEEE Trans. Inf. Theory, 47, No. 2:599-618, February 2001, and in T. J. Richardson, M. A. Shokrollahi, and R. L. Urbanke. "Design of capacity-approaching irregular low-density parity-check codes." IEEE Trans. Inf. Theory, 47, No. 2:618-637, February 2001.

Experimental results show that the deviation of RCA from the exact density evolution threshold is less than 0.01 dB. Like in the T. Y. Chen article "Protograph-based raptor-like LDPC codes" we used RCA to design protographs for rate-compatible code families within 0.4 dB of the normal approximation on finite-length performance for a block-length of 16,384 at FER $10^{-5}$.

Embodiments of the feedback-less technology utilize protographs designed using a hybrid version of RCA to characterize performance on the two-mode channel. Because the goal of this code is to deliver the reliabilities of these bits to the parallel decoders, the protographs should be designed to optimize the messages (maximize the likelihoods) or minimize the log-loss distortion at a fixed SNR rather than to decode correctly at the lowest possible SNR. The hybrid RCA should use both parameters of the erasure probability and SNR to optimize the connections in the PBRL-structured protograph.

The recent results of Mitchell et al. in D. G. M. Mitchell, M. Lentmaier, A. E. Pusane, and D. J. Costello. "Randomly punctured spatially coupled LDPC codes." In Int. Symp. on Turbo Codes and Iterative Information Processing (ISTC), pages 1-6, Bremen, August 2014, and D. G. M. Mitchell, M. Lentmaier, A. E. Pusane, and D. J. Costello. "Approximating decoding thresholds of punctured LDPC code ensembles on the AWGN channel." In IEEE Int. Symp. on Info. Theory, pages 421-425, Hong Kong, June 2015, show how the density evolution threshold of a mother code can be used to characterize the performance of that code for the full range of random erasure probabilities provides a useful tool in this analysis.

2.9 A Peeling Decoder Approach

The above discussion treats the incremental-redundancy decoder as a one-shot device. However, a more flexible approach which can be employed by at least some embodiments of the present disclosure is to allow the incremental-redundancy decoder the ability to refine its results based on successful decoding during the current stage. With the additional side information from successful decoders in the current stage, the incremental-redundancy decoder can recover additional redundancy for more parallel decoders. This is directly analogous to the "peeling decoder" described in M. G. Luby, M. Mitzenmacher, M. A. Shokrallahi, and D. A. Spielman. "Efficient erasure correcting codes." IEEE Trans. on Info. Th., 47(2):569-584, February 2001., which is at the heart of iterative erasure decoding. In the above article, each success of the peeling decoder unlocks an additional noiseless bit or frame. In the present disclosure, each time this peeling decoder is successful, new incremental redundancy for a parallel decoder is seen as if it were sent directly over the AWGN channel.

The recent work of Zeineddine and Mansour in "Interframe coding for broadcast communication." IEEE J. Select. Areas Commun.—Recent Advances in Capacity-Approaching Codes, To Appear 2016, demonstrates the feasibility of this peeling-decoder approach for recovering incremental redundancy. This approach is one technique for providing incremental redundancy only to the decoders that need it.

Zeineddine and Mansour consider all segments of incremental redundancy to be of the same length and to be interchangeable from the perspective of the decoder. Considering Table 1, it can be seen that the optimal increments for the middle 6 or 7 stages are all around eleven bits. Thus embodiments of our feedback-less technology may combine some or all stages of incremental redundancy as described in the Zeineddine and Mansour article.

2.10 Variable-Length Codes that Approach Capacity

At the crux of the present disclosure is the combination of variable-length codes that approach capacity with short average blocklengths by using incremental redundancy (that would previously have been controlled by feedback) and a technique for delivering that incremental redundancy without using feedback. Thus, the present disclosure requires the existence of variable-length codes that approach capacity with short average blocklengths by using an initial transmission followed by up to m−1 transmissions of incremental redundancy called increments.

The NB-LDPC code with m=10, whose performance was shown in FIG. 1, provides an existence proof that a variable-length code exists that can come close enough to capacity at a short-enough blocklength to enable the present disclosure. This code achieves 93% of the capacity of the BI-AWGN channel for k=280, where 280 information bits are used along with an 8-bit CRC to determine that decoding was successful. For this system, the target variable-length codeword error rate is $10^{-3}$ and the average blocklength is below 500 symbols.

The 1024-state TBCC code with ROVA explored in "A. R. Williamson, T.-Y. Chen, and R. D. Wesel. Variable-length convolutional coding for short blocklengths with decision feedback. IEEE Trans. Commun., 63(7):2389-2403, July 2015." provide a second example, achieving a smaller percentage of capacity but at an even shorter average blocklengths. With k=64 this code achieves 82% of capacity with m=5, 84% of capacity with m=16, and 86% of capacity with m=32.

The PBRL codes in "T. Y. Chen, K. Vakilinia, D. Divsalar, and R. D. Wesel, Protograph-based Raptor-Like LDPC codes. IEEE Trans. Commun., 63(5):1522-1532, May 2015." closely approach capacity for their blocklengths, and provide another possible family of variable-length codes that can be used in embodiments of the present disclosure.

In any case, to practice the present disclosure, a variable-length code must be identified that approaches capacity (i.e., achieves at least 75% of the Shannon capacity but preferably more than 90% of capacity) with a short average blocklength (average blocklength of less than 1500 symbols but preferably less than 500 symbols) by using incremental redundancy that is required only when a previous decoding stage has failed. This variable length code is utilized to send multiple k-bit messages in parallel and encodes the incremental redundancy of these messages together in a way that the receiver can, without using feedback, access the needed incremental redundancy for all or almost all of those decoders that fail to decode in a previous stage, while still achieving a throughput close to that of the system that uses the variable-length code with feedback and thus still closely approaches capacity.

2.10 Additional Embodiments

As additional embodiments, we consider two example designs that utilize the interframe coding approach of Zeineddine and Mansour and a TBCC that achieves over 80% of the Shannon Capacity with an average blocklength that is less than 150 symbols.

The performance of a VL code with incremental redundancy (IR) and feedback is characterized by the throughput rate $R_t^{(FB)}$ achieved while not exceeding a target (codeword) undetected error rate $P_{UE}$, where $$R_t^{(FB)} = \frac{E[K]}{E[N]},$$

where E[K] represents the expected number of information bits transmitted by the VL code, and E[N] represents the average number of transmitted symbols (i.e., average blocklength) of the VL code. In describing these embodiments, K is a random variable describing how many bits were successfully transmitted by a variable-length code so that K takes on values of k or zero. The unit of throughput (or rate) in discussing these embodiments is bits per transmitted symbol. The probability of failure $P_j$ is the probability that a VL codeword cannot be decoded even at its maximum length when all IR has been received. Ideally, $R_t^{(FB)}$ should be as close to the channel capacity as possible.

Let $\ell_j$ represent the length (i.e., number of symbols) of the $j^{th}$ transmission $X_j$ for a VL codeword, where X represents a multi-symbol sequence. Also let m represent the maximum number of transmissions allowed. After the initial transmission $X_1$ of length $\ell_1$, the transmitter sends IR transmissions $X_j$ of length $\ell_j$, j∈{2, ... m} if requested by the receiver.

Let p.m.f. δ={δ(1), ... δ(ω), ... δ(m+1)} represent the probability that a codeword requires ω transmissions including the initial transmission to decode successfully, i.e., ω total transmissions. Thus for 1≤ω≤m, δ(ω) is the probability that a codeword was successfully decoded after ω transmissions, and δ(m) is the probability of failure to decode even after the initial transmission and all m−1 available IR transmissions are received. Let $\varepsilon_{FB}$ be the target failure probability $P_f$ of a feedback system. The requirement δ(m+1)≤$\varepsilon_{FB}$ must be satisfied.

The p.m.f. δ(ω) plays a critical role in the design of the system. In at least one embodiment, we obtain δ(ω) for our target short variable-length code through Monte-Carlo simulation. It should be noted that our design procedure places no restriction on δ(ω).

With this notation, E[K]=k×(1−δ(m+1)−$P_{UE}$) where k represents the number of information bits in the message W encoded in a VL codeword. The expected blocklength E[K] of the VL code is $$E[K] = \sum_{j=1}^{m}\left(\delta(j) \times \sum_{i=1}^{j} l_i\right) + \delta(m+1) \times \sum_{i=1}^{m} l_i.$$

For these embodiments we focus on the system described in "A. R. Williamson, T.-Y. Chen, and R. D. Wesel. Variable-length convolutional coding for short blocklengths with decision feedback. IEEE Trans. Commun., 63(7):2389-2403, July 2015." in which a 1024-state TBCC using feedback from a reliability output Viterbi algorithm (ROVA) achieve 82% of 2 dB BI-AWGN capacity with m=5 transmissions with an average blocklength of less than 150 symbols and a target codeword error rate of $10^{-3}$. In this disclosure, all simulations demonstrating this embodiment are conducted using the 2 dB BI-AWGN channel, and by way of example, all systems in these embodiments have a target failure rate $\varepsilon_{FB}=10^{-3}$.

In these embodiments, the IR transmissions may be used in any order (guaranteed by the pseudorandom puncturing of Williamson et. al.,) and have constant length, with for example $\ell_1 = \ell_2 = \ldots = \ell_m = \ell_\Delta$. The optimal lengths $\ell_j$ for IR transmissions in a variable-length code with m possible transmissions as determined using SDO, in general, are variable. However, our simulations indicate that a capacity can still be approached with the suboptimal solution that requires constant increments (CI). Table 2 shows a comparison between the best variable-increment (VI) and CI system designs for the 1024-state TBCC with k=64 information bits and m=5.

Table 2 shows that the best CI design achieves 99% of the $R_t^{(FB)}$ of the VI designs, so that the CI requirement does not significantly affect performance. To accommodate some additional failure mechanisms in the system without feedback, the increment size is increased by one to 16 for the CI system used in our simulations in the next section, identified as "Actual" in Table 2. This CI design still achieves 98.5% of the $R_t^{(FB)}$ of the VI designs. The increment sizes of 15 or 16 is considered here to approach capacity with a short blocklength, and are significantly smaller than those contemplated in Zeineddine and Mansour, which has increment sizes on the order of 550 symbols, as utilized to combat fading.

2.10.1 Transmitter

The transmitter uses L VL codewords to send in parallel L messages $W_1, \ldots, W_L$, each containing k bits of information. The VL code we use for at least one embodiment of our design is the k=64, 1024-state TBCC with m=5 from Williamson et. al. Each message $W_i$ is encoded by the VL encoder to produce the initial transmission $X_1^{(i)}$ with length $l_1$ and the IR sequences $X_j^{(i)}$ for $j=2, \ldots, m$ all of length $l_\Delta$. The initial transmissions $X_1^{(i)}$ are transmitted directly over the channel, but the IR sequences $X_j^{(i)}$ for $j=2, \ldots, m$ are not directly transmitted over the channel. Instead, a second code (the inter-frame code of Zeineddine and Mansour) combines increments from different VL codes through exclusive- or operations. For example, the first transmitted linear combination might be $I_1 = X_1^{(1)} \oplus X_2^{(2)} \oplus X_1^{(n)}$, where $\oplus$ indicates bitwise exclusive- or.

Figure 7:
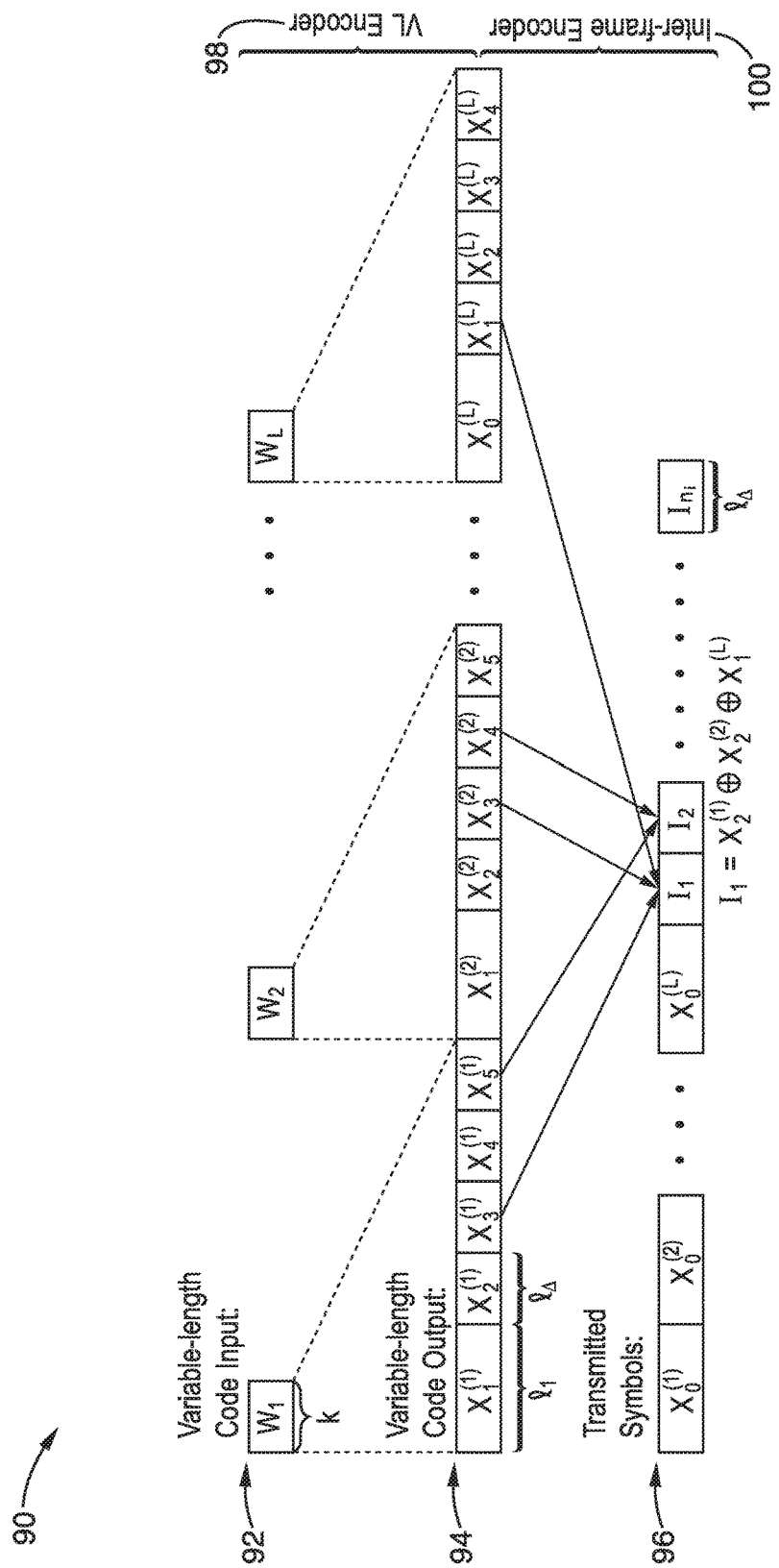
FIG. 7 is a block diagram of a prior-art technique of inter-frame coding, showing variable-length code inputs and outputs, along with transmitted symbols.

FIG. 7 illustrates a diagram of the overall process including the VL encoders and the inter-frame code. A total of $n_i$ such linear combinations are created and transmitted over the channel. Each linear combination has the length $l_\Delta$, since it is a linear combination of IR sequences all of length $l_{66}$.

It is instructive to compare the rate of this feedforward (i.e., no feedback) system to the original feedback system using the same CI VL codes. The rate of the feedback system is $R_t^{(FB)}$ as defined in Eq. (1). With the feedforward system, $L \cdot l_0 + n_i \cdot l_\Delta$ symbols are transmitted for the $n_c$ k-bit messages encoded by the system, so the rate is $$R_t^{(FF)} = \frac{Lk(1 - \varepsilon_{FF} - P_{UE})}{Ll_0 + n_i l_\Delta}.$$

Our inter-frame code design uses the p.m.f. $\delta(\omega)$ to find a degree distribution for an LDGM code that can provide the needed incremental redundancy to the L decoders of the parallel VL codes with the smallest value of $n_i$, while still achieving a failure rate $\varepsilon_{FF}$ that is below the target.

The inter-frame code has the Tanner graph that is a generalization of the low-density generator matrix (LDGM) codes described, for example, in "J. F. Cheng and R. L. McEliece, Some high-rate near capacity codes for the Gaussian Channel," in Proc. of 34$^{th}$ Allerton Conference on Communication, Control, and Computing." Let each of the $n_c$ VL codewords be represented by a systematic node of Cheng and McEliece, and each of the $n_i$ linear combinations of IR be represented by a parity node of Cheng and McEliece. The rate of the LDGM code is defined as $$R_i = \frac{L}{L + n_i}.$$

From Eq. (3) and Eq. (4), $R_t^{(FF)}$ is a function of the $R_i$ as follows $$R_t^{(FF)} = \frac{k(1 - \varepsilon_{FF} - P_{UE})}{l_0 + (R_i^{-1} - 1)l_\Delta}.$$

Thus increasing $R_i$ also increases $R_t^{(FF)}$.

2.10.2 Receiver

The following describes the generalized peeling decoder utilized in at least one embodiment of the present disclosure for decoding the incremental redundancy code. At the beginning of each iteration, every undecoded VL code attempts to decode with its (noisy) initial transmission $X_0$ and any (noisy) IR symbols that are available to it from the incremental redundancy decoder. The successfully decoded VL codes calculate their remaining IR sequences $X_j$ and send these to the parity nodes that are connected to the systematic nodes corresponding to those VL codes.

When a parity node has received IR sequences $X_j$ from all connected systematic nodes except one remaining systematic node r, the linear combination of all received $X_j$ sequences is used to apply the correct sign to the reliability of each bit of the combination-IR sequence $I_j$, and the resulting noisy IR sequence $X_j^{(r)}$, is provided to the VL decoder for code r with reliabilities equivalent to what would have been received if $X_j^{(r)}$ had been directly transmitted over the channel. This process repeats until no new VL codes can be decoded.

Zeineddine and Mansour analytically derived inter-frame code degree distributions for the specific case of a geometric $\delta(\omega)$ based on their application of combating fading on a broadcast channel.

In this example of the present disclosure, we focus on a single-user point-to-point channel with a well-defined channel capacity. For this application $\delta(\omega)$ will not be a geometric distribution. A differential evolution process is utilized to construct the generalized LDGM degree distribution for any $\delta(\omega)$, and designing regular and irregular LDGMs according to these degree distributions, and simulate their performance using a generalized peeling decoder.

2.10 Design of the Incremental Redundancy Code

In this section, a design methodology is provided to obtain the LDGM codes that operate as incremental redundancy codes in an embodiment of the overall system. Given m and a channel distribution $\delta(\omega)$, it is shown how to obtain LDGM codes that enable the overall system to approach the throughput of the original feedback codes (and thus the channel capacity), but without feedback.

In Zeineddine and Mansour, a message passing algorithm is considered in the analysis of the inter-frame code. We analyze a peeling decoder, "M. G. Luby, M N. Mitzenmacher, M. A. Shokrollahi, and D. A. Spielman, "Efficient Error correcting codes" IEEE Trans. Inf. Theory, vol. 47, no.

2, pp 569-584, February 2001." to reduce the decoding complexity of the actual system.

A density-evolution approach can be used to characterize the asymptotic decoding failure rate and the number of iterations required to achieve it. For this analysis, the messages are modeled from parity nodes to systematic nodes as a single bit: a 1 if an IR sequence can be provided to a VL decoder and a 0 otherwise. Similarly, a message of 1 from a systematic node to a parity node represents the event where the systematic node can send an IR sequence $X_j$ to the parity node and a 0 otherwise.

Let z be the probability that a randomly picked parity-to-systematic message is 0 in the current iteration. Let g(z) describe the probability that a randomly picked systematic-to-parity message is 0 given z in the current iteration, and f(z) describe the probability that a randomly picked parity-to-systematic message is 1 in the next iteration. For any decoder, there always exists a z* such that $$1-f(z)<z, \forall z \in [z^*, 1] \quad (13)$$

For any pair of systematic-node edge degree distribution polynomial $\lambda(z)=\Sigma_i \lambda_i x^{i-1}$ and parity-node edge degree distribution polynomial $\rho(x)=\Sigma_i \rho_i x^{i-1}$, f(z) can be calculated as $$f(z) = \sum_i \rho_i (1-g(z))^{i-1} = \rho(1-g(z)), \quad (14)$$

and g(z) can be calculated as $$g(z) = \sum_d \lambda_d \cdot g_d(z) = \sum_d \lambda_d \cdot \left( \sum_\omega \delta(\omega) \cdot g_{d;\omega}(z) \right). \quad (15)$$

Because we analyze a generalized peeling decoder rather than a message-passing decoder, our calculation of $g_{d;\omega}(z)$ below is different from Zeineddine and Mansour:

$$g_{d;\omega}(z) = \sum_{j=0}^{\min(\omega-1,d)} \binom{d}{j} \cdot (1-z)^j \cdot z^{d-j}. \quad (16)$$

Similarly, the systematic node error rate can be calculated as $$G(z) = \sum_d \Lambda_d \cdot g_d(z), \quad (17)$$

where $\Lambda(x)=\Sigma_i \Lambda_i x^{i-1}$ is the systematic-node degree distribution polynomial.

It should be appreciated that in an actual decoder of the inter-frame code, the degree distributions and the channel distribution $\delta(\omega)$ change after every iteration. As a result, Eq. (13)-(16) provide a precise characterization of the decoding process only for the first iteration. For later iterations, the analysis in this section is an approximation, and performance of the differential evolution below is improved by replacing the approximation with the actual density evolution results for the generalized peeling decoder we have developed.

By way of example and not limitation, we use the approach of differential evolution (DE) "A. Shokrollahi and R. M. Storn, "Design of efficient erasure codes with differential evolution" in "Differential Evolution: a practical approach to global optimization. Springer Verlag Berlin Heidelberg, 2005, ch. 7 pp 413-426" to optimize the degree distributions for the generalized LDGM code. The asymptotic error rate (of systematic nodes) is minimized. The constraints of the optimization are $R_i$, the maximum systematic degree L, the maximum parity degree R, and the target error rate. There are L+R variables, L+R-3 of which need to be optimized. The parameter vector is defined to be $p=\{\lambda_2, \ldots, \lambda_{L-1}, \rho_2, \ldots \rho_R\}$. The process has the following general steps:

(1) Initialization: First, a pair $(\lambda_C(x), \rho_C(x))$ that satisfies the degree and rate constraints is generated, and for example, the Chebyshev center of the L+R-3 dimension feasibility space is a workable choice. Second, an initial population of size $N_P$ is generated iteratively using the hit-and-run sampler "R. L. Smith, "Efficient Monte Carlo procedures for generating points uniformly distributed over bounded regions," Operations Research, vol. 32, no. 6, pp 1296-1308, November 1984." as follows. From point $p_i$, the sampler chooses a random direction. A feasible random point in that direction is selected as the new point $p_{i+1}$. In the following we use G to represent the generation number of a population, and the initialization population has G=0.

For each point in the population, z* is calculated using Eq. (13)-(16), and the asymptotic error rate of systematic nodes G(z*) is determined using Eq. (17).

From the definition of z and f(z), we have the following relationship between the probability z in consecutive iterations:

$$z_{i+1}=1-f(z_i),$$

where the subscript i represents the i th iteration. The number of iterations required to achieve z* can be obtained by setting $z_0=1$, and finding the smallest i that satisfies $z_i=z^*$.

(2) Mutation: For each point $p_i$ in the generation G(i=0, 1, \ldots, $N_P$-1), a generation G+1 point $v_{i,G+1}=\{v_{0i,G+1}, v_{1i,G+1}, \ldots, v_{(L+R-3)i,G+1}\}$ is produced using $$v_{i,G+1}=p_{best,G}-0.5 \cdot (p_{r1,G}-p_{r2,G}+p_{r3,G}-p_{r4,G}).$$

The point $p_{best,G}$ represents the point in the G th generation that has the lowest G(z*), and $r_1$, $r_2$, $r_3$ and $r_4$ are randomly chosen over $[0,N_P-1]$.

(3) Recombination: A new generation G+1 point $u_{i,G+1}=\{u_{0i,G+1}, u_{1i,G+1}, \ldots, u_{(L+R-3)i,G+1}\}$ is generated from $v_{i,G+1}$ using the following procedure for j=0, 1, \ldots, L+R-4:

$$u_{ji,G+1} = \begin{cases} v_{ji,G+1} & \text{if } U_{rand,j} \leq P_{CR} \text{ or } j = K(i), \\ p_{ji,G} & \text{otherwise} \end{cases}.$$

Here $U_{rand,j} \in [0,1]$ is a randomly generated value following a uniform distribution for each j, K(i) is a randomly chosen index over $[0,N_P-1]$ that stays the same for point i, and $P_{CR}$ is the crossover probability.

(4) Selection: In this step, $u_{i,G+1}$ or $p_{i,G}$ is selected as $p_{i,G+1}$. For designing the inter-frame code, the selection criteria are G(z*) and the number of iterations to achieve G(z*). Between the two, the error rate is favored as it indicates the code's correction capability. The point with the lower G(z*) and smaller, or the same number, of iterations is chosen.

After selecting the (G+1) th generation, the process starts from mutation again. The iterative process stops after a certain number of generations. If the error rate after the maximum number of iterations is higher than the target error rate ε, then the preset rate $R_i$ is too high.

In this embodiment, the maximum systematic node degree is L=4 (since m=5). The maximum parity node degree is R=10 for our irregular code. In this example, we set the population size $N_P$=500, the maximum number of generations as 50, and the crossover probability $P_{CR}$=1. It should be appreciated with this example, and others throughout the text, that other sets of values may be utilized for specific applications without departing from the teachings of the present disclosure.

If the incremental redundancy code is designed using "Best" CI lengths in Table 2, the error rate would very likely be higher than the target. Therefore, we use the "Actual" CI lengths in Table 2. The target error rate of the differential evolution process is set accordingly to $\varepsilon=6\times10^{-4}$, slightly above the failure rate of the VL code using the CI "Actual" lengths. We use the Progressive edge growth (PEG) algorithm of Hu et al., "X.-Y. Hu, E Eleftheriou, and D. M. Arnold, "Regular and irregular progressive edge growth Tanner graphs," IEEE Transactions on Information Theory, vol. 51, no. 1, pp 386-398, January 2005" to construct the incremental redundancy codes based on the degree distribution that we obtain. In our degree distributions obtained from DE, we observed that the systematic-node degree distributions have extremely high percentage (>99.99%) of degree L=4 nodes. We construct the LDGM graph from the perspective of parity nodes, then modified the graph from the perspective of systematic nodes, while maintaining the girth, to make sure all systematic nodes have a degree of 4. The highest rate regular and irregular incremental redundancy codes designed according to the procedure described above are now presented. Both codes have 100,000 systematic nodes. Simulations of the incremental redundancy coder are conducted using the $\delta(\omega)$ generated from simulating a k=64 1024-state TBCC under 2 dB BI-AWGN channel with m=5 transmissions. The resulting $\delta(\omega)$ was found to be the following:

$$\delta=\{0.333036, 0.448600, 0.182245, 3.15894\times10^{-2}, 4.02445\times10^{-3}, 5.05161\times10^{-4}\}.$$

The regular code ideally has only degree-4 systematic nodes and degree-3 parity nodes, and rate $R_i=3/7\approx0.428571$. The actual code matrix has a systematic-node degree distribution $\lambda=\{0, 0, 0, 1\}$ and a parity-node degree distribution $\rho=\{0, 0, 0.0001, 0.9999\}$, for example, it is very slightly irregular. The rate of the code described by our actual code matrix is $R_i=0.428578$. The rate of overall feedforward system $R_t^{(FF)}=0.494503$. The simulated failure probability of the inter-frame code is $6.691\times10^{-4}$.

The highest-rate irregular code we designed has a theoretical rate $R_i=0.48$. From the differential evolution process, the systematic-node degree distribution is $\lambda=\{0,0,0,1\}$, and the parity-node degree distribution is $$\rho=\{2.73614\times10^{-3}, 2.36956\times10^{-3}, 0.445366, 0.213356, 0.188564, 2.68009\times10^{-2}, 4.89986\times10^{-2}, 1.21422\times10^{-3}, 1.77664\times10^{-2}, 3.15029\times10^{-2}\}.$$

The actual code matrix has $\lambda=\{0,0,0,1\}$ as its systematic-node degree distribution. The parity-node degree distribution is $$\rho=\{2.6575\times10^{-3}, 2.4735\times10^{-2}, 0.4420125, 0.21653, 0.1872125, 2.8155\times10^{-2},$$

$4.84225\times10^{-2}$, $1.46\times10^{-3}$, $1.9215\times10^{-2}$, $2.96\times10^{-2}\}$. The rate of the code described by the code matrix is $R_i=0.480008$. The rate of the feedforward system $R_t^{(FF)}=0.510182$. The failure rate of the inter-frame code is $8.979\times10^{-4}$.

Table 3 compares the results with the best feedback system under the same constraints. The irregular feedforward system achieves more than 95% of the best $R_i^{(FB)}$ for m=5. In addition to the density evolution approximation analysis in a later section, we also determined the exact density evolution for both the regular and irregular code.

Figure 8:
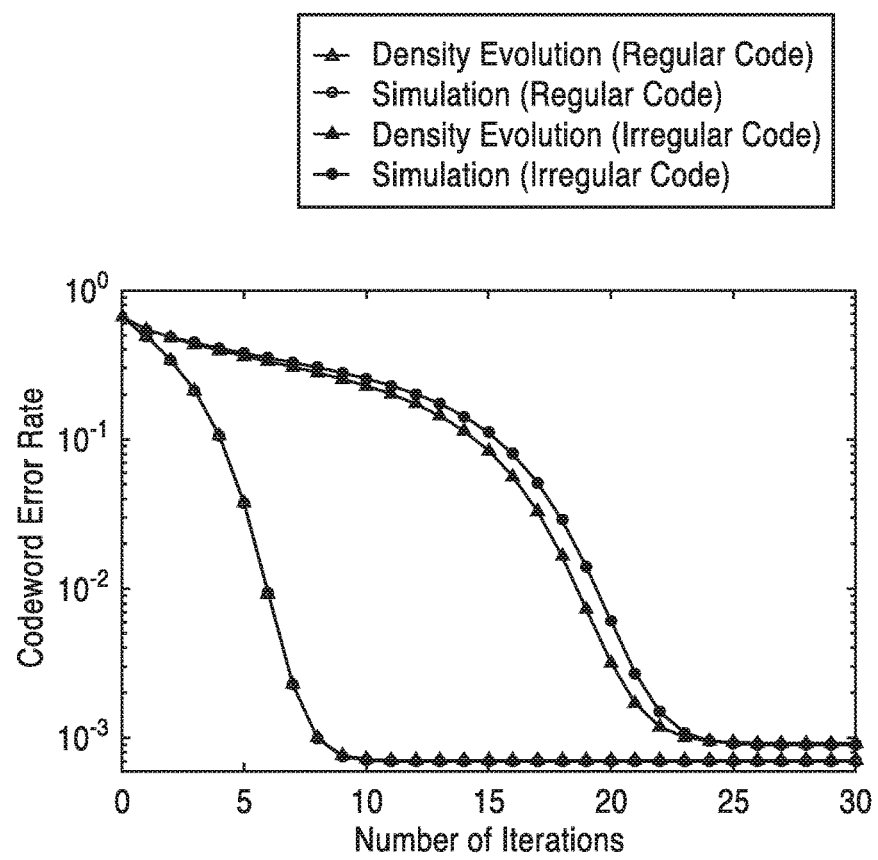
FIG. 8 is a plot of regular and irregular LDGM code performance curves in addition to performance predicted by density evolution for codes designed for an embodiment of the present disclosure.

FIG. 8 compares the density evolution prediction of the codeword error rate at each iteration with the simulation result. The regular code's result is very closely approximated by the density evolution. The simulation result of the irregular code is also close to density evolution, and the prediction of the asymptotic codeword error rate matches with the simulation result in both cases.

While the embodiments presented here used 100,000 systematic nodes and thus $n_c$=100,000, we have used the same approach to design systems with $n_c$=10,000 and $n_c$=1,000.

3. Summary of Embodiments

This disclosure describes a new system that combines variable-length codes that approach capacity with short average blocklengths by using incremental redundancy (that would previously have been controlled by feedback) and a technique for delivering that incremental redundancy without using feedback. Thus, the present disclosure requires the existence of variable-length codes that approach capacity with short average blocklengths by using incremental redundancy.

The new system approaches capacity by harvesting the ergodicity benefits of long blocklengths while achieving the decoder complexity of a short-blocklength code. The transmitter first sends the initial transmission for multiple short blocklength codes without additional processing. Some of these short-blocklength codes can be redundant in that they are produced by a fixed-length packet-level erasure code. The subsequent stages that follow the initial transmission are produced by an incremental redundancy encoder that combines and compresses the incremental redundancy associated with a stage (or in some embodiments with multiple stages). The incremental redundancy encoders associated with different stages will typically be different and have different rates because with each stage more of the short blocklength codes are successfully decoded. However, the number of symbols or bits transmitted for each stage or group of stages is a fixed number that is established based on the amount of redundancy needed for that stage which in turn is based on the minimum number of decoders successful in previous stages, which is a function of channel quality. Also, the lengths of the incremental redundancy associated with different stages of the short-blocklength encoder are typically different, although they might be the same in some embodiments.

Similar to network coding, the incremental redundancy encoder may employ linear combinations of the incremental redundancy stages of the short blocklength codes. Other embodiments of the incremental redundancy encoder include separately compressing the incremental redundancy using lossy compression under a distortion criteria, such as log loss distortion. This compressed incremental redundancy would then be transmitted with additional channel coding if needed. In still other embodiments, the incremental redundancy encoder can employ joint source-channel encoding using, for example, a protograph-based LDPC code designed for a channel that has both noisy symbols that correspond to the symbols that are actually transmitted over the channel noiseless symbols that may be erased. The noiseless symbols correspond to incremental redundancy for the short-blocklength codes that have successfully decoded and the erasures correspond to incremental redundancy for the short-blocklength codes that have not yet successfully decoded.

At the decoder, after the initial transmission (the first stage of incremental redundancy) is received, decoding is attempted for each short-blocklength code. In the second and subsequent stages of incremental redundancy, the incremental redundancy decoder provides short blocklength decoders that have not yet successfully decoded with incremental redundancy to continue decoding. Once decoding is successful for a short-blocklength code, it provides information to the incremental redundancy decoder. The incremental redundancy may not provide all of the short blocklength decoders with incremental redundancy at the same time because in some embodiments it may use successful decoding occurring during that stage to unlock incremental redundancy for some of the short blocklength codes.

The enhancements described in the presented technology can be readily implemented within various error correcting communication encoders and decoders. It should also be appreciated that such encoders and decoders are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

Computer and memory devices were not depicted in the diagrams for the sake of simplicity of illustration, as one of ordinary skill in the art recognizes the use of computer devices for carrying out steps involved with communications encoding and decoding. Computers may be utilized for controlling the encoders and/or decoders, as well as for performing elements of the encoding and decoding, without limitation. The use of computers does not preclude the use of other forms of circuitry, as these are often combined in various embodiments of encoders/decoders. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, computer processor, central processing unit (CPU), and computer are used synonymously to denote a device capable of executing the instructions and communicating with input/output interfaces and/or peripheral devices, and that the terms processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. A transmitter apparatus in a communications system, said transmitter comprising: (a) one or more variable-length encoders for a variable-length code configured to take as input a k-bit message and to produce as output an initial transmission sequence of length $\ell_1$ symbols and one or more increments having lengths $\ell_2, \ldots, \ell_m$ symbols, such that if said initial transmission sequence and said increments were transmitted based on non-active ACK/NACK feedback, said variable-length code would approach capacity by exceeding at least a specified percentage of Shannon capacity of a specified point-to-point channel, without using feedback to control the transmission of said increments; and (b) an incremental redundancy encoder configured to compress and encode increments produced by said one or more variable-length encoders to produce a common pool of incremental redundancy to be made available for all variable-length codes at a receiver; (c) wherein said transmitter apparatus is configured to utilize said one or more variable-length encoders to produce said initial transmission sequences of a plurality L of said k-bit messages, which are transmitted to a receiver over a channel between said transmitter and said receiver; (d) wherein said transmitter apparatus is configured to transmit to said receiver over said channel between said transmitter and said receiver a number of transmitted symbols, corresponding to a common pool of redundancy for the plurality L of said k-bit messages; (e) wherein said number of transmitted symbols corresponding to the common pool of redundancy approximates a number of symbols of incremental redundancy that would have been sent by L independently operating variable-length encoders if said increments were transmitted based on non-active ACK/NACK feedback on said specified point-to-point channel; (f) wherein said transmitter apparatus is configured to approach Shannon capacity of a specified point-to-point channel, having a rate similar to that achieved by capacity-approaching variable-length code when utilized with non-active ACK/NACK feedback; and (g) wherein probability of either failing to decode a k-bit message, or decoding a k-bit message in error is below a target value.

2. The transmitter apparatus of any preceding embodiment, wherein said initial transmission and said one or more increments have lengths $\ell_1, \ldots, \ell_m$ that have been optimized using sequential differential approximation.

3. The transmitter apparatus of any preceding embodiment, wherein said variable-length encoder is configured for utilizing a low-density parity-check code.

4. The transmitter apparatus of any preceding embodiment, wherein said variable-length encoder comprises a tail-biting convolutional encoder with rate-compatible puncturing.

5. The transmitter apparatus of any preceding embodiment, in which the increment lengths $\ell_2, \ldots, \ell_m$ are all less than 50.

6. The transmitter apparatus of any preceding embodiment, in which the variable length code has an average blocklength of less than 500 symbols were it to be used with non-active ACK/NACK feedback on the specified point-to-point channel.

7. The transmitter apparatus of any preceding embodiment, wherein said variable-length code achieves more than 90% of the Shannon capacity of said specified point-to-point channel.

8. The transmitter apparatus of any preceding embodiment, wherein said incremental redundancy encoder is configured to separately encode each of the m−1 increments associated with a k-bit message, so that at stage j where j∈{2, . . . , m}, said incremental redundancy encoder is configured to take as input L increments, each of length $\ell_j$ and to produce as output a portion of a common pool of incremental redundancy associated with increment j.

9. The transmitter apparatus of any preceding embodiment, wherein said incremental redundancy encoder is configured for jointly encoding at least a portion of said m−1 increments associated with a k-bit message, so that in one of its operations said incremental redundancy encoder takes as input s groups of L increments associated with s consecutive stages, having lengths $\ell_j, \ell_{j+1}, \ldots, \ell_{j+s-1}$ to jointly produce a portion of a common pool of incremental redundancy associated with increments j through j+s−1.

10. The transmitter apparatus of any preceding embodiment, wherein said transmitter apparatus is configured for being utilized in an optical point-to-point channel.

11. The transmitter apparatus of any preceding embodiment, wherein number of symbols produced by said incremental redundancy encoder for each stage depends on a probability that a variable length decoder will determine that it has successfully decoded before requiring incremental redundancy associated with that stage as well as a length $v_j$ of an increment for that stage and said number L of variable-length codes with some overhead to account for uncertainty in said number of variable length decoders that determine successful decoding before that stage.

12. The transmitter apparatus of any preceding embodiment further comprising: an additional encoder configured for protecting said k-bit messages so that all user information is recovered even if some k-bit messages are not successfully decoded by said variable-length decoders; and wherein said additional encoder is configured to take L×$R_e$ k-bit messages containing user information as input and produce as output said plurality L of said k-bit messages encoded by said variable-length encoders so that probability that the full set of L×$R_e$ k-bit messages is not recovered successfully as a super-frame error rate, is below a target value.

13. The transmitter apparatus of any preceding embodiment, wherein said incremental redundancy encoding is accomplished in response to utilizing separate source code and channel code, in which said source code compresses said increments and said channel code protects compressed increments.

14. The transmitter apparatus of any preceding embodiment, wherein said incremental redundancy encoding is configured for utilizing a single encoding operation that jointly compresses and sufficiently protects said increments to produce symbols ready for transmission.

15. The transmitter apparatus of any preceding embodiment, wherein said transmitter apparatus is configured to utilize said one or more variable-length encoders to produce in parallel said initial transmissions of a plurality L of said k-bit messages.

16. A receiver apparatus in a communications system, said receiver apparatus comprising: (a) one or more variable-length decoders for a variable-length code where variable length codewords are comprised of an initial transmission sequence of length $\ell_1$ symbols by itself, or together with up to m−1 increments having lengths $\ell_2, \ldots, \ell_m$ symbols, such that if said initial transmission and said increments were transmitted based on non-active ACK/NACK feedback, said variable-length would approach capacity by exceeding at least a specified percentage of Shannon capacity of a specified point-to-point channel, without using feedback to control the transmission of said increments; (b) wherein said variable-length decoders are configured for performing multiple decoding attempts, in which each successive attempt utilizes as its input an input sequence of a previous attempt plus an additional increment; (c) wherein said one or more variable-length decoders is configured for producing for each attempt either a decoded k-bit message or an indication that no decoded k-bit message is available for that attempt; (d) an incremental redundancy decoder configured for receiving as input (d)(i) received symbols corresponding to a common pool of redundancy produced by an incremental redundancy encoder, and (d)(ii) increments produced by already-decoded k-bit messages, and said incremental redundancy decoder is configured for producing output increments for use by said variable-length decoders; (e) wherein said one or more variable-length decoders is configured to first attempt decoding of said plurality of L initial transmissions, each corresponding to a k-bit message, which are transmitted over a channel between the transmitter and the receiver, and continue until decoding is successful; (f) wherein said one or more variable-length decoders is configured for continuing to attempt decoding by a variable-length decoder whenever an additional increment is made available from said incremental redundancy decoder for said variable-length decoder for that k-bit message; (g) wherein said incremental redundancy decoder is configured for utilizing increments corresponding to each successfully-decoded k-bit message to subsequently produce additional increments for said variable-length decoders until no more new increments from successfully-decoded k-bit messages are available; (h) wherein said number of received symbols corresponding to the common pool of redundancy approximates said number of symbols of incremental redundancy that would have been sent by L independently operating variable-length encoders if said increments were received based on non-active ACK/NACK feedback from a receiver on that same channel; (i) wherein a communications system utilizing said receiver apparatus approaches Shannon capacity of said specified point-to-point channel, having a rate similar to that achieved by capacity-approaching variable-length code when used with non-active ACK/NACK feedback; and (j) wherein probability of either failing to decode a k-bit message, or decoding a k-bit message in error, is below a target value.

17. The receiver apparatus of any preceding embodiment, wherein said initial transmission and said one or more increments are configured with lengths $\ell_1, \ldots \ell_m$ that have been optimized using sequential differential approximation.

18. The receiver apparatus of any preceding embodiment, wherein said receiver apparatus is configured for utilizing a cyclic redundancy check to determine whether each variable length decoding attempt was successful.

19. The receiver apparatus of any preceding embodiment, wherein said incremental redundancy decoder is configured for separately decoding each of said m−1 groups of increments associated with k-bit messages, so that at stage j where $j \in \{2, \ldots, m\}$, said incremental redundancy decoder takes as input both a common pool of incremental redundancy associated with increment j from said variable-length code applied to each of said L k-bit messages and the $j^{th}$ increment of length $\ell_j$ corresponding to said k-bit messages that have already been successfully decoded to produce said increments each of length $\ell_j$ corresponding to said k-bit messages that have not yet been successfully decoded.

20. The receiver apparatus of any preceding embodiment, wherein said incremental redundancy decoder is configured for jointly decoding some of said groups of m−1 increments associated with a k-bit message, so that in one of its operations said incremental redundancy decoder takes as input both said common pool of incremental redundancy associated with s groups of L increments associated with s consecutive stages, having lengths $\ell_j, \ell_{j+1}, \ldots, \ell_{j+s-1}$ and s increments with lengths $\ell_j, \ell_{j+1}, \ldots, \ell_{j+s-1}$ corresponding to said k-bit messages that have already been successfully decoded to produce said s increments with lengths $\ell_j, \ell_{j+1}, \ldots, \ell_{j+s-1}$ corresponding to said k-bit messages that have not yet been successfully decoded.

21. The receiver apparatus of any preceding embodiment, wherein said receiver apparatus is configured for use in an optical point-to-point channel.

22. The receiver apparatus of any preceding embodiment: further comprising an additional decoder configured for recovering any k-bit messages not successfully decoded by said variable-length decoders; and wherein said additional decoder is configured for taking as input said decoded k-bit messages and locations of k-bit messages that could not be decoded, and said additional decoder is configured for producing a full set of L k-bit messages as a result, while failing only when too many k-bit messages are not successfully decoded by said variable-length codes, which occurs with a probability below a target value for the specified point-to-point channel.

23. A method for communicating information at a rate approaching capacity by exceeding at least a specified percentage of Shannon capacity on a specified point-to-point channel, comprising the steps: (a) utilizing one or more variable-length encoders for a variable-length code within a transmitter circuit that takes as input a k-bit message and produces as output an initial transmission sequence of length $\ell_1$ symbols and one or more increments having lengths $\ell_2, \ldots, \ell_m$ symbols; (b) wherein, if said initial transmission and said increments were transmitted based on non-active ACK/NACK feedback, then said variable-length codes approach capacity by exceeding at least a specified percentage of Shannon capacity of a specified point-to-point channel, without using feedback to control the transmission of said increments; (c) compressing and encoding increments produced by said one or more variable-length encoders, which perform incremental redundancy encoding, to produce a common pool of incremental redundancy to be made available for all variable-length codes at a receiver; (d) utilizing said one or more variable-length encoders within a transmitter circuit to produce initial transmissions responsive to a plurality L of said k-bit messages, which are transmitted over said specified point-to-point channel, and transmitting over said specified point-to-point channel symbols corresponding to said common pool of redundancy responsive to said plurality L of said k-bit messages; (e) wherein said number of transmitted symbols corresponding to said common pool of redundancy approximates said number of symbols of incremental redundancy that would have been sent by L independently operating variable-length encoders if said increments were transmitted based on non-active ACK/NACK feedback on the specified point-to-point channel; (f) wherein a receiver circuit is configured for utilizing said one or more variable-length decoders for performing multiple decoding attempts where each successive attempt uses as its input an input sequence of a previous attempt plus an additional increment, and wherein said one or more variable-length decoders is producing for each attempt either a decoded k-bit message, or an indication that no decoded k-bit message is available for that attempt; (g) utilizing an incremental redundancy decoder taking as input: (g)(i) received symbols corresponding to a common pool of redundancy produced by an incremental redundancy encoder, and (g)(ii) increments produced by already-decoded k-bit messages and producing as output increments that can be used by said variable-length decoders; (h) first attempting to decode said plurality of L initial transmissions within said one or more variable-length decoders, each of said L initial transmissions corresponding to a k-bit message, which are transmitted over said specified point-to-point channel, and continuing until decoding is successful, by continuing to attempt decoding whenever an additional increment is made available from said incremental redundancy decoder for said variable-length decoder for that k-bit message; (i) utilizing increments corresponding to each successfully-decoded k-bit message within said incremental redundancy decoder to subsequently produce additional increments for said variable-length decoders until no more new increments from successfully-decoded k-bit messages are available; (j) wherein said method approaches Shannon capacity of said specified point-to-point channel, having a rate similar to that achieved by capacity-approaching variable-length codes when used with non-active ACK/NACK feedback; and (k) wherein probability of either failing to decode a k-bit message, or decoding a k-bit message in error, is below a target value.

24. The method of any preceding embodiment, wherein said initial transmission and said one or more increments have lengths $\ell_1, \ldots, \ell_m$ that have been optimized using sequential differential approximation.

25. The method of any preceding embodiment, further comprising utilizing an additional encoder in a transmitter circuit, and an additional decoder in the receiver circuit, for protecting said k-bit messages so that all user information can be recovered even if some k-bit messages are not successfully decoded by said variable-length decoders, said additional encoder taking $L \times R_e$ k-bit messages containing user information as input and producing as output the L k-bit messages encoded by said variable-length encoders so that probability that a full set of $L \times R_e$ k-bit messages is not recovered successfully is below a target value.

26. The method of any preceding embodiment, further comprising jointly encoding at least a portion of said m−1 increments associated with a k-bit message in said incremental redundancy encoder, so that in one of its operations said incremental redundancy encoder takes as input s groups of L increments associated with s consecutive stages, having lengths $\ell_j, \ell_{j+1}, \ldots, \ell_{j+s-1}$ to jointly produce a portion of said common pool of incremental redundancy associated with increments j through j+s−1.

27. A transmitter apparatus in a communications system, said transmitter apparatus comprising: (a) one or more variable-length encoders for a variable-length code configured to take as input a k-bit message and to produce as output an initial transmission sequence of length $\ell_1$ symbols and one or more increments having lengths $\ell_2, \ldots, \ell_m$ symbols, such that if said initial transmission sequence and said increments were transmitted based on non-active ACK/NACK feedback, said variable-length code would approach capacity by exceeding at least a specified percentage of Shannon capacity of a specified point-to-point channel, without using feedback to control the transmission of said increments; and (b) an incremental redundancy encoder configured to compress and encode increments produced by said one or more variable-length encoders to produce a common pool of incremental redundancy to be made available for all variable-length codes at a receiver; (c) wherein said transmitter apparatus is configured to utilize said one or more variable-length encoders to produce said initial transmission sequences of a plurality L of said k-bit messages, which are transmitted to a receiver over a channel between said transmitter and said receiver; (d) wherein said transmitter apparatus is configured to transmit to said receiver over said channel between said transmitter and said receiver a number of transmitted symbols, corresponding to a common pool of redundancy for the plurality L of said k-bit messages; (e) wherein said number of transmitted symbols corresponding to the common pool of redundancy approximates a number of symbols of incremental redundancy that would have been sent by L independently operating variable-length encoders if said increments were transmitted based on non-active ACK/NACK feedback on said specified point-to-point channel; (f) wherein said transmitter apparatus is configured to approach Shannon capacity of a specified point-to-point channel, having a rate similar to that achieved by capacity-approaching variable-length code when utilized with non-active ACK/NACK feedback; and (g) wherein probability of either failing to decode a k-bit message, or decoding a k-bit message in error is below a target value.

28. The transmitter apparatus of any preceding embodiment, wherein the initial transmission has a length $\ell_1$ obtained using sequential differential approximation and the one or more subsequent transmission sequences called increments all have the same length $\ell_\Delta$, where the same length is determined by approximating the set of lengths obtained using sequential differential approximation by a single length.

29. The receiver apparatus of any preceding embodiment, wherein initial transmission has a length $\ell_1$ obtained using sequential differential approximation and the one or more subsequent transmission sequences called increments all have the same length $\ell_\Delta$ where said same length is determined by approximating the set of lengths obtained using sequential differential approximation by a single length.

30. The transmitter apparatus of any preceding embodiment, wherein s=m−1.

31. The receiver apparatus of any preceding embodiment, wherein s=m−1.

32. The transmitter apparatus of any preceding embodiment, wherein incremental redundancy encoder is a generalized low-density generator matrix (LDGM) code that linearly combines increments with all various degrees of the systematic nodes described by a degree distribution the various degrees of the parity nodes described by a different degree distribution.

33. The transmitter apparatus of any preceding embodiment, wherein the LDGM code is regular, with all systematic nodes having the same degree and all parity nodes have the same degree.

34. The transmitter apparatus of any preceding embodiment, wherein the LDGM code is irregular, so that not all parity nodes have the same degree.

35. The transmitter apparatus of any preceding embodiment, wherein the degree distribution was obtained by differential evolution.

36. The transmitter apparatus of any preceding embodiment, wherein the increment lengths $\ell_2, \ldots, \ell_m$ are all less than 20.

37. The transmitter apparatus of any preceding embodiment, wherein the variable length code has an average blocklength of less than 150 symbols is used with non-active ACK/NACK feedback on the specified point-to-point channel.

38. The transmitter apparatus of any preceding embodiment, wherein the variable-length code achieves more than 75% of the Shannon capacity of the specified point-to-point channel.

39. The receiver apparatus of any preceding embodiment, wherein a reliability function such as can be produced by the tail-biting reliability-output Viterbi algorithm is used by the receiver to determine whether each variable length decoding attempt was successful.

40. A method of high throughput communication with low frame error rates (FER), the method comprising: coupling a plurality of short blocklength error checking encoders in parallel, as parallel encoders, through common incremental redundancy; coupling a plurality of short blocklength error checking decoders in parallel, as parallel decoders, through common incremental redundancy; transmitting, at an encoder of a transmission side, a plurality of short blocklength code words in parallel to said parallel encoders; conveying encoded output communication from said transmission side to a receiver side; decoding, at a decoder on a receiver side, a plurality of short blocklength code words in parallel from each of said parallel decoders; receiving side information for said decoding, from the parallel decoders that have already successfully identified their codewords; and providing incremental redundancy to the parallel decoders that have not yet successfully identified their codewords, in response to processing of said side information.

41. The method of any preceding embodiment, wherein said error checking comprises parity checking.

42. The method of any preceding embodiment, wherein said parity checking comprises low density parity checking (LDPC).

43. The method of any preceding embodiment, wherein incremental redundancy is generated without feedback to only select decoders that require it.

44. The method of any preceding embodiment, wherein determining an amount of incremental redundancy to utilize in response to solving central limit theorem arguments.

45. The method of any preceding embodiment, wherein said method is configured for harvesting the ergodicity benefits of long blocklengths while achieving low decoder complexity of a short-blocklength code by leveraging performance of short-blocklength codes with incremental redundancy.

46. The method of any preceding embodiment, wherein said method performs encoding and decoding at a rate which can approach capacity at high throughputs while permitting strong guarantees on frame error rate (FER) performance.

47. An apparatus for high throughput communication with low frame error rates (FER), the apparatus comprising: an error checking encoder comprising a plurality of short blocklength error checking encoders in parallel, as parallel encoders, which are coupled through common incremental redundancy; an error checking decoder comprising a plurality of short blocklength error checking decoders in parallel, as parallel decoders, which are coupled through common incremental redundancy; wherein communication is encoded at said error checking encoder, and configured for transmission to said error checking decoder; conveying encoded output communication from said transmission side to a receiver side; wherein said error checking decoder is configured for decoding a plurality of short blocklength code words in parallel from each of its said parallel decoders; wherein receiving side information is utilized in said decoding, from each of the parallel decoders that have already successfully identified their codewords; and wherein incremental redundancy is provided to the parallel decoders that have not yet successfully identified their codewords, in response to processing of said side information.

48. A method for high throughput communication with low frame error rates (FER), the method comprising: using short-blocklength codes to achieve capacity with incremental redundancy; transmitting and decoding a large number of short-blocklength codewords in parallel; and delivering incremental redundancy without feedback only to the decoders that need incremental redundancy.

49. An apparatus for high throughput communication with low frame error rates (FER), the apparatus comprising: an error checking encoder comprising a plurality of short blocklength error checking encoders in parallel, as parallel encoders, which are coupled through common incremental redundancy; an error checking decoder comprising a plurality of short blocklength error checking decoders in parallel, as parallel decoders, which are coupled through common incremental redundancy; wherein short-blocklength codes are used to achieve capacity with incremental redundancy; wherein a large number of short-blocklength codewords are transmitted and decoders in parallel; and wherein incremental redundancy is delivered without feedback only to the decoders that need incremental redundancy.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

All cited publications and other references are incorporated herein by reference in their entireties.

TABLE 1

Parameters for m = 10, FER = $10^{-3}$, k = 280, with NB-LDPC computed using SDO

| Stage (j) | $\ell(I_j)$ | $N_j$ | $P(i \in S_j)$ |
|---|---|---|---|
| 1 | 428 | 428 | 0.0937 |
| 2 | 13 | 441 | 0.2142 |
| 3 | 11 | 452 | 0.3555 |
| 4 | 10 | 462 | 0.4981 |
| 5 | 10 | 472 | 0.6352 |
| 6 | 11 | 483 | 0.7625 |
| 7 | 13 | 496 | 0.8705 |
| 8 | 16 | 512 | 0.9463 |
| 9 | 23 | 535 | 0.9878 |
| 10 | 49 | 584 | 0.9997 |

TABLE 2

Performance Comparison between VI and CI Designs
2 dB BI-AWGN, m = 5, $\varepsilon = 10^{-3}$, k = 64, 1024-state TBCC

| | | Transmission Length $\ell_1, \ldots, \ell_5$ (bits) | Rate $R_t^{(FB)}$ | Simulated Failure Rate $\delta(6)$ |
|---|---|---|---|---|
| VI | ES[1] | 107, 9, 10, 13, 29 | 0.528756 | $9.42967 \times 10^{-4}$ |
| | SDO[2] | 106, 10, 10, 13, 29 | 0.528655 | $9.42967 \times 10^{-4}$ |
| CI | Best | 107, 15, 15, 15, 15 | 0.522791 | $9.26128 \times 10^{-4}$ |
| | Actual | 108, 16, 16, 16, 16 | 0.520843 | $5.05167 \times 10^{-4}$ |

[1]Exhaustive search;
[2]Sequential differential optimization

TABLE 3

Performance of the Feedforward Systems

|  | Rate $R_t^{(FF)}$ | Simulated Error Rate | Percentage of Capacity | Percentage of Feedback[1] |
|---|---|---|---|---|
| Regular | 0.494503 | 6.691 × 10−4 | 77.01% | 93.52% |
| Irregular | 0.510182 | 8.979 × 10−4 | 79.45% | 96.48% |

[1]The percentage of $R_t^{(FF)}$ w.r.t. the $R_t^{(FB)}$ of the best feedback system (the first row in Table 2).

What is claimed is:

1. A transmitter apparatus in a communications system, said transmitter apparatus comprising:
   (a) one or more variable-length encoders for a variable-length code configured to take as input a k-bit message and to produce as output an initial transmission sequence of length $\ell_1$ symbols and a set of m−1 increments, where m is an integer greater than one, all increments having the same length $\ell_\Delta$, such that if said initial transmission sequence and said increments were transmitted based on non-active ACK/NACK feedback, said variable-length code would approach capacity by exceeding a specified percentage of Shannon capacity of a specified point-to-point channel; and
   (b) an incremental redundancy encoder configured to combine the increments produced by said one or more variable-length encoders to produce a common pool of incremental redundancy to be made available for all variable-length codes at a receiver;
   (c) wherein said one or more variable-length encoders are configured to produce said initial transmission sequence for a plurality L of said k-bit messages, which are transmitted to a receiver over a channel between said transmitter and said receiver;
   (d) wherein said transmitter apparatus is configured to additionally transmit to the receiver over said channel between said transmitter and the receiver a number of transmitted symbols less than L×(m−1)×$\ell_\Delta$, corresponding to a common pool of incremental redundancy for the plurality L of said k-bit messages;
   (e) wherein said number of transmitted symbols corresponding to the common pool of redundancy approximates a number of symbols of incremental redundancy that would have been sent by L independently operating variable-length encoders if said increments were transmitted based on non-active ACK/NACK feedback on said specified point-to-point channel;
   (f) wherein said transmitter apparatus is configured to have a rate approaching the rate achieved by the capacity-approaching variable-length code when utilized with non-active ACK/NACK feedback;
   (g) wherein probability of either failing to decode a k-bit message, or decoding a k-bit message in error is below a target value; and
   (h) wherein k is a number of bits in a message that is encoded by a variable length encoder, $\ell$ is a length in symbols of a transmission, m is a number of stages including an initial transmission and m−1 additional stages of incremental redundancy, and L is a number of short-blocklength codewords.

2. The transmitter apparatus of claim 1, wherein said initial transmission sequence of length $\ell_1$ is obtained by using sequential differential optimization and the increment length $\ell_\Delta$ is obtained by approximating the set of lengths obtained by sequential differential optimization by a single length.

3. The transmitter apparatus of claim 1:
   wherein the incremental redundancy encoder is a generalized low-density generator matrix (LDGM) code in which systematic nodes correspond to variable-length encoders/decoders and parity nodes correspond to linearly combined length-$\ell_\Delta$ increments; and
   wherein the systematic nodes have various degrees described by a systematic-node degree distribution and the parity nodes have various degrees described by a parity-node degree distribution.

4. The transmitter apparatus of claim 3, wherein all the systematic nodes have the same degree, which is the number m−1 of increments produced by each variable-length encoder.

5. The transmitter apparatus of claim 3, wherein all the parity nodes have the same degree.

6. The transmitter apparatus of claim 3, wherein all the parity nodes are of a sufficiently close degree that parity node degrees are one of two consecutive integers.

7. The transmitter apparatus of claim 3, wherein said parity node degree distribution is obtained by differential evolution.

8. The transmitter apparatus of claim 1, wherein the increment length $\ell_\Delta$ is less than 20.

9. The transmitter apparatus of claim 1, wherein the variable length code has an average blocklength of less than 150 symbols if used with non-active ACK/NACK feedback on the specified point-to-point channel.

10. The transmitter apparatus of claim 1, wherein said transmitter apparatus is configured for being utilized in an optical point-to-point channel.

11. The transmitter apparatus of claim 1, wherein said plurality L of k-bit messages includes redundant k-bit messages resulting from an additional encoder that allows recovery of k-bit messages not successfully decoded and/or allows recovery of k-bit incorrectly decoded by said variable-length decoders.

12. A receiver apparatus in a communications system, said receiver apparatus comprising:
   (a) one or more variable-length decoders configured for receiving a variable-length code where variable-length codewords are comprised of an initial transmission sequence of length $\ell_1$ symbols by itself, or together with a set of up to m−1 increments, where m is an integer greater than one, all increments having the same length $\ell_\Delta$, such that if said initial transmission and said increments were transmitted based on non-active ACK/NACK feedback, said variable-length code would approach capacity by exceeding a specified percentage of Shannon capacity of a specified point-to-point channel;
   (b) wherein said variable-length decoders are configured for performing multiple decoding attempts, in which each successive attempt utilizes as its input an input sequence of a previous attempt plus one or more additional increments;
   (c) wherein said one or more variable-length decoders is configured for producing for each attempt either a decoded k-bit message or an indication that no decoded k-bit message is available for that attempt; and
   (d) an incremental redundancy decoder configured for receiving as input (d)(i) received symbols corresponding to a common pool of redundancy produced by an incremental redundancy encoder, and (d)(ii) increments produced by already-decoded k-bit messages, and wherein said incremental redundancy decoder is configured for producing output increments for use by said variable-length decoders;

(e) wherein said one or more variable-length decoders is configured to first attempt decoding of said plurality of L initial transmissions, each corresponding to a k-bit message, which are transmitted over a channel between the transmitter and the receiver, and continue until decoding is successful or no more increments are available;

(f) wherein said one or more variable-length decoders is configured for continuing to attempt decoding by a variable-length decoder whenever an additional increment is made available from said incremental redundancy decoder for said variable-length decoder for that k-bit message;

(g) wherein said incremental redundancy decoder is configured for utilizing increments corresponding to each successfully-decoded k-bit message to subsequently produce additional increments for said variable-length decoders until no more new increments from successfully-decoded k-bit messages are available;

(h) wherein said number of received symbols received by the incremental redundancy decoder is less than $L \times (m-1) \times \ell_\Delta$, corresponding to the common pool of incremental redundancy, which approximates said number of symbols of incremental redundancy that would have been sent by L independently operating variable-length encoders if said increments were received based on non-active ACK/NACK feedback from a receiver on that same channel;

(i) wherein a communications system utilizing said receiver apparatus approaches Shannon capacity of said specified point-to-point channel, having a rate similar to that achieved by capacity-approaching variable-length code when used with non-active ACK/NACK feedback;

(j) wherein probability of either failing to decode a k-bit message, or decoding a k-bit message in error, is below a target value; and (k) wherein k is a number of bits in a message that is encoded by a variable length encoder, $\ell$ is a length in symbols of a transmission, m is a number of stages including an initial transmission and m−1 additional stages of incremental redundancy, and L is a number of short-blocklength codewords.

13. The receiver apparatus of claim 12:
wherein the incremental redundancy decoder is a decoder for a generalized low-density generator matrix (LDGM) code where the systematic nodes correspond to variable-length encoders/decoders and the parity nodes correspond to linearly combined length-$\ell_\Delta$ increments; and
wherein the systematic nodes have various degrees described by a systematic-node degree distribution and the parity nodes have various degrees described by a parity-node degree distribution.

14. The receiver apparatus of claim 13, wherein all the systematic nodes have the same degree, which is the number m−1 of increments produced by each variable-length encoder.

15. The receiver apparatus of claim 13, wherein all the parity nodes have the same degree.

16. The receiver apparatus of claim 13, wherein all the parity nodes are of a sufficiently close degree that parity node degrees are one of two consecutive integers.

17. The receiver apparatus of claim 12, wherein said receiver apparatus is configured for utilizing a cyclic redundancy check to determine whether each variable length decoding attempt was successful.

18. The receiver apparatus of claim 12, wherein said variable length code from said transmitter is configured for utilizing a reliability function as produced by a reliability-output Viterbi algorithm in a receiver to determine whether each variable-length decoding attempt was successful.

19. The receiver apparatus of claim 12, wherein said receiver apparatus is configured for use in an optical point-to-point channel.

20. The receiver apparatus of claim 12:
further comprising an additional decoder configured for recovering any k-bit messages not successfully decoded by said variable-length decoders; and
wherein said additional decoder is configured for taking as input said decoded k-bit messages and locations of k-bit messages that could not be decoded, and said additional decoder is configured for producing a full set of L k-bit messages as a result, while failing only when too many k-bit messages are not successfully decoded by said variable-length codes, which occurs with a probability below a target value for the specified point-to-point channel.

* * * * *